(12) United States Patent
Yamazaki et al.

(10) Patent No.: US 7,292,280 B2
(45) Date of Patent: Nov. 6, 2007

(54) CAMERA, APERTURE CONTROLLING METHOD AND APPARATUS, LENS CONTROLLING METHOD AND APPARATUS, AND EDGING AMOUNT CONTROLLING METHOD AND APPARATUS

(75) Inventors: Akihisa Yamazaki, Asaka (JP); Atsushi Misawa, Asaka (JP); Shigeru Kondo, Asaka (JP); Michitaka Nakazawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 978 days.

(21) Appl. No.: 09/873,311

(22) Filed: Jun. 5, 2001

(65) Prior Publication Data
US 2001/0048474 A1    Dec. 6, 2001

(30) Foreign Application Priority Data
Jun. 5, 2000    (JP) ............................. 2000-167566
May 15, 2001   (JP) ............................. 2001-144339

(51) Int. Cl.
*H04N 5/238*    (2006.01)
*H04N 5/232*    (2006.01)
*H04N 5/235*    (2006.01)
*G03B 7/00*     (2006.01)

(52) U.S. Cl. .................... 348/363; 348/345; 348/221.1; 396/213

(58) Field of Classification Search ................ 348/363
See application file for complete search history.

(56) References Cited

U.S. PATENT DOCUMENTS

| 5,585,942 | A | * | 12/1996 | Kondo ........................ 348/297 |
| 5,831,676 | A | * | 11/1998 | Takahashi et al. ........... 348/362 |
| 5,883,666 | A | * | 3/1999  | Kyuma et al. ............... 348/363 |
| 6,636,262 | B1 | * | 10/2003 | Okajima et al. ............. 348/363 |
| 6,720,995 | B1 | * | 4/2004  | Kaneda et al. .............. 348/363 |
| 6,727,949 | B1 | * | 4/2004  | Saruwatari et al. .......... 348/349 |
| 6,906,751 | B1 | * | 6/2005  | Norita et al. ................ 348/349 |

FOREIGN PATENT DOCUMENTS

| JP | 553170    |   | 3/1993 |
| JP | 08-237544 | * | 9/1996 |

* cited by examiner

*Primary Examiner*—David Ometz
*Assistant Examiner*—Nhan T. Tran
(74) *Attorney, Agent, or Firm*—Birch, Stewart, Kolasch & Birch, LLP

(57) ABSTRACT

Maximum and minimum aperture sizes are regulated with regard to a diaphragm in order to secure predetermined optical capability in an optical unit which includes a taking lens and the diaphragm. In a normal taking, the diaphragm is used within a normal taking range from the maximum to the minimum aperture sizes. In the present invention, an aperture size which is larger than the maximum size and a size which is smaller than the minimum size (extra aperture size or extra small size) are respectively set at outside the range that secures the capability. The aperture sizes of the diaphragm at outside the specified range are used at least for one of the following: automatic exposure (AE) adjustment, auto focus (AF) adjustment, electronic zoom, displaying a moving image, taking for recording the moving image, and taking under a low resolution by thinning out pixels.

21 Claims, 25 Drawing Sheets

F I G. 1
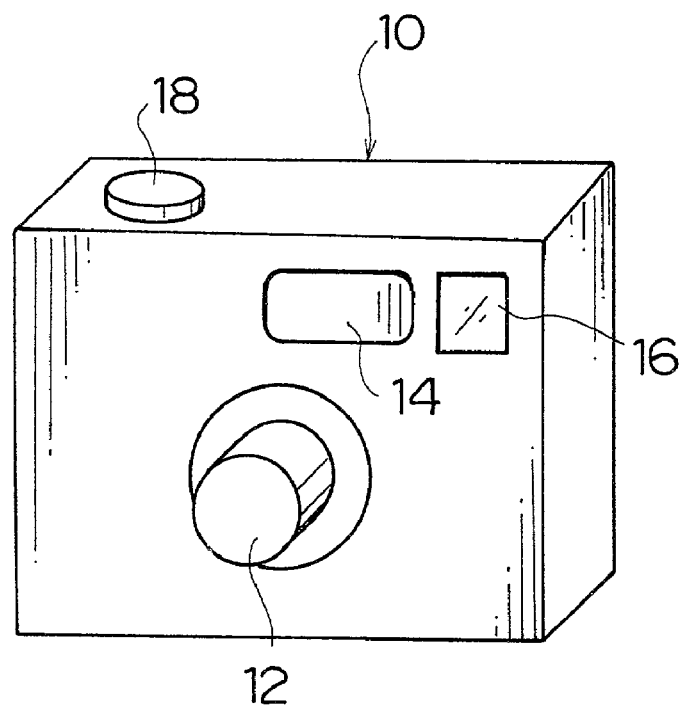
F I G. 2
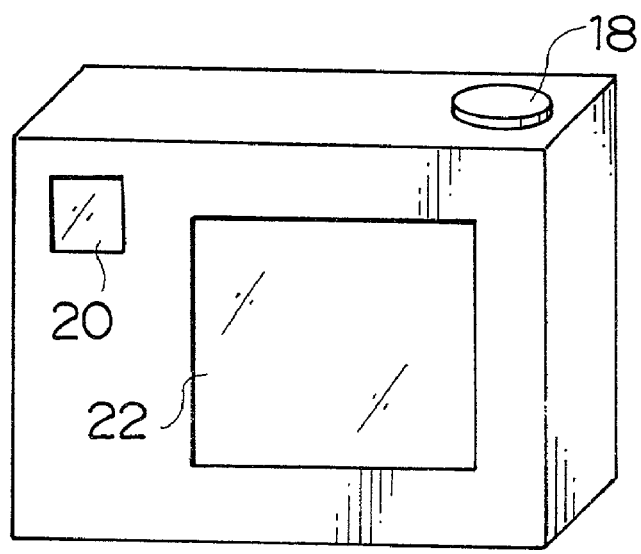

F I G. 7
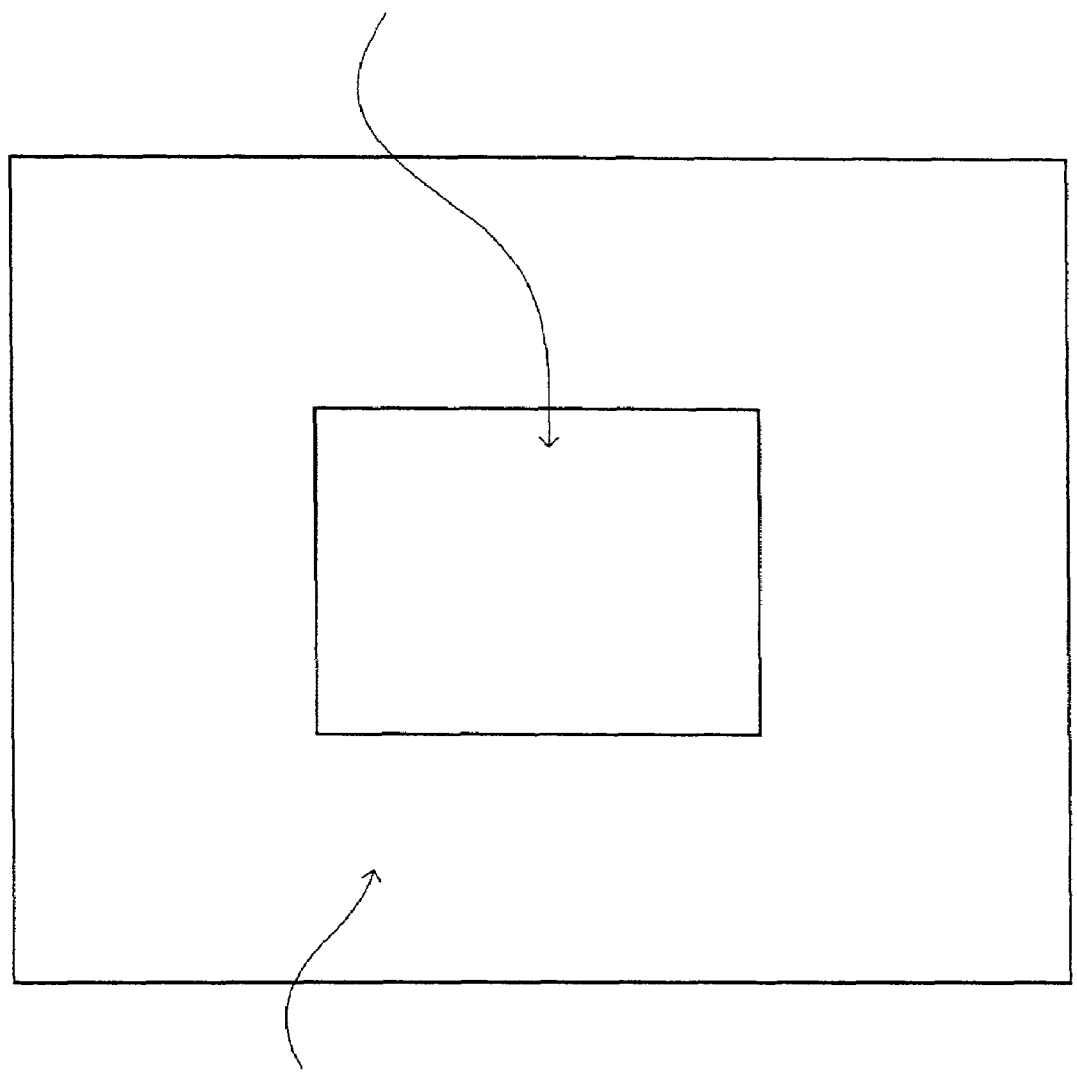

F I G. 2 1
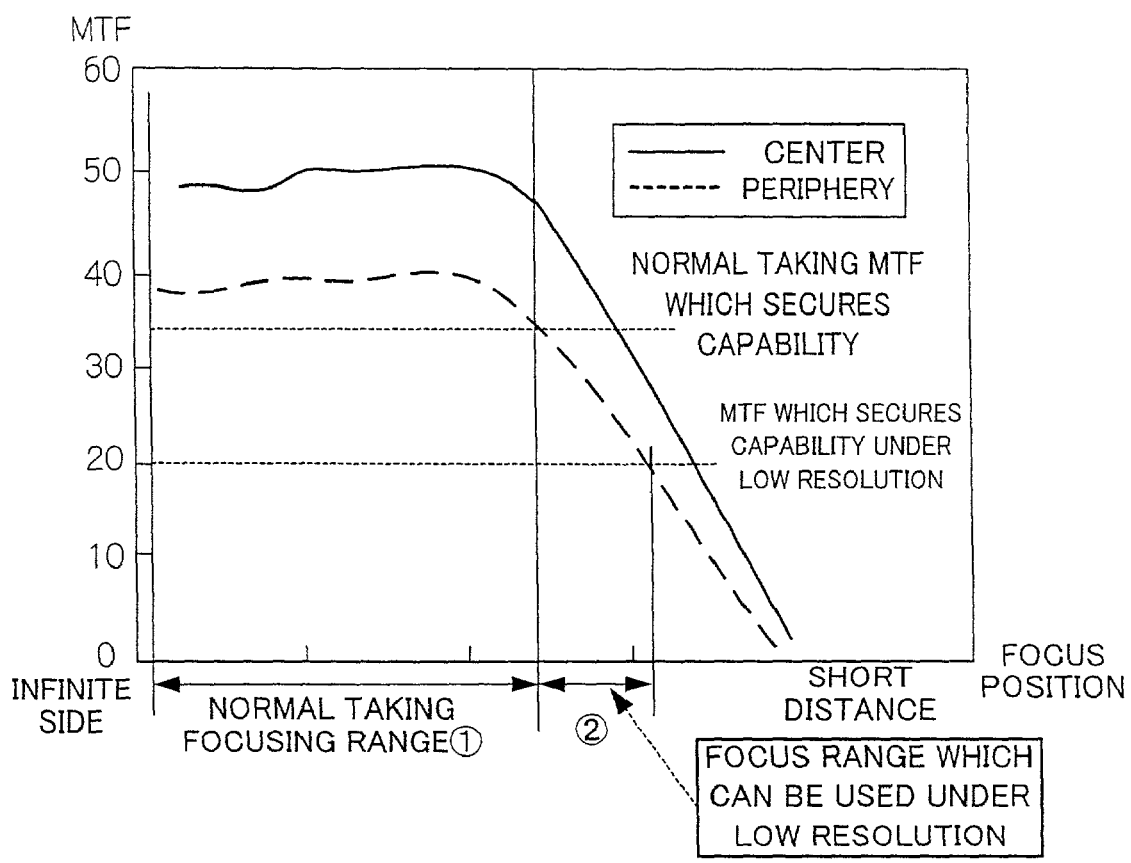

CAMERA, APERTURE CONTROLLING METHOD AND APPARATUS, LENS CONTROLLING METHOD AND APPARATUS, AND EDGING AMOUNT CONTROLLING METHOD AND APPARATUS

BACKGROUND OF THE INVENTION

1. Field of the Invention

The present invention relates to a camera such as a digital camera, a video camera and a silver-halide camera, an aperture controlling method, an aperture controlling apparatus, a lens controlling method, a lens controlling apparatus, an edging amount controlling method and an edging amount controlling apparatus which are applied to an optical system of the camera.

2. Description of the Related Art

In a conventional art, an operatable range of a lens is restricted with regard to a diaphragm for a camera, a point-blank limit, and a zoom limit, in order to secure a predetermined optical capability (e.g. an imaging capability) of the lens. Concerning the diaphragm for example, a maximum and a minimum aperture sizes are so specified as to control the diaphragm within the operatable range. Japanese Patent Application Laid-open No. 5-53170 discloses changing a diaphragm corresponding with a zoom position and correcting a variance of the diaphragm due to zooming. A diaphragm adjusting system using a solid-state imaging device illuminates an auxiliary light if a subject is too dark, and also raises outputting power by gaining an output from the imaging device (called "gain-up"), thereby gaining a signal level.

However, in an automatic exposure adjustment (AE), because noise compositions are amplified by gaining up and performing photometry if the brightness of the subject is too low, many errors occur, and photometry capability at a low brightness is poor. Similarly, with an auto focusing adjustment in which a portion having the most of high frequency compositions of a video signal is a focus position, focusing capability is lowered because the noise compositions are amplified if the output signal of the imaging signal is amplified.

Other problems concerning the conventional camera are that: the camera easily vibrates when using an electronic zoom, an image quality of a movie display for confirming a view angle is deteriorated with respect to the subject with a low brightness, observability of the movie display is poor due to a smear phenomenon which occurs in taking of the subject with extreme brightness, and so forth.

SUMMARY OF THE INVENTION

The present invention has been developed in view of the above-described circumstances, and has as its object the provision of a method and apparatus for controlling a diaphragm of camera and camera which achieves improvement of capability as a camera, by suitably using a diaphragm which is larger than a maximum diaphragm for a normal taking and a diaphragm which is smaller than a minimum diaphragm for a normal taking corresponding with a use.

Moreover, the present invention provides a technique for improving and expanding the capability of the camera by proving a wider interlocking range than a normal taking range, with regard not only to the diaphragm but also to a zoom range (operatable range of a focal length) and a focus adjustment range, and using the lens at outside the range which secures its capability corresponding with a taking condition and a special use.

In order to achieve the above-described objects, the present invention is directed to a method for controlling an aperture of a camera, comprising the steps of: determining an aperture out of an aperture range for a normal shooting which secures predetermined optical capability; and controlling a diaphragm mechanism to use the aperture for at least one of the following: automatic exposure, auto focus, electronic zoom, real-time displaying of a moving image, recording of a moving image, and recording an image with a low resolution due to reduced pixels.

According to the present invention, a maximum and a minimum aperture sizes are so specified as to secure predetermined optical capability of the lens, and in a normal taking, an aperture size within a focus range of a normal taking from the maximum to the minimum aperture sizes is used. In the present invention, an aperture size at outside the specified range (extra aperture size) which has a larger size than the maximum size, or an aperture size at outside the specified range (extra small size) which has a smaller aperture size than the minimum aperture size, or both of the extra aperture size and extra small size are provided to the diaphragm mechanism. The focus positions are used when activating at least one of the following: automatic exposure, auto focus, electronic zoom, movie display, taking for recording a moving image, and taking under a low resolution by thinning out pixels.

Therefore, the capability of the lens can be fully used without deteriorating the taken image, and the respective capability of the camera can be improved.

In order to achieve the above-described objects, the present invention is directed to an apparatus for controlling an aperture of a camera, comprising: a first determining device that determines an aperture range for a normal shooting which secures predetermined optical capability; a second determining device that determines an aperture range including an aperture out of the aperture range for the normal shooting; and a controlling device that controls a diaphragm mechanism to set an aperture within the aperture range determined by the second determining device for at least one of automatic exposure and auto focus, and controls the diaphragm mechanism to set an aperture within the aperture range determined by the first determining device for recording of an image.

In order to achieve the above-described objects, the present invention is directed to an apparatus for controlling an aperture of a camera, comprising: a first determining device that determines an aperture range for a normal shooting which secures predetermined optical capability; a second determining device that determines an aperture range including an aperture out of the aperture range for the normal shooting; and a controlling device that controls a diaphragm mechanism to set an aperture within the aperture range determined by the second determining device for a shooting with electronic zoom, and controls the diaphragm mechanism to set an aperture within the aperture range determined by the first determining device for a shooting without the electronic zoom.

In order to achieve the above-described objects, the present invention is directed to an apparatus for controlling an aperture of a camera, comprising: a first determining device that determines an aperture range for a normal shooting which secures predetermined optical capability; a second determining device that determines an aperture range including an aperture out of the aperture range for the normal shooting; and a controlling device that controls a diaphragm mechanism to set an aperture within the aperture range determined by the first determining device for recording of a still image, and controls the diaphragm mechanism to set an aperture within the aperture range determined by the second determining device for at least one of real-time displaying of a moving image and recording of a moving image.

In order to achieve the above-described objects, the present invention is directed to an apparatus for controlling an aperture of a camera, comprising: a first determining device that determines an aperture range for a normal shooting which secures predetermined optical capability; a second determining device that determines an aperture range including an aperture out of the aperture range for the normal shooting; and a controlling device that controls a diaphragm mechanism to set an aperture within the aperture range determined by the first determining device for a shooting in a high-resolution mode with a large number of pixels, and controls the diaphragm mechanism to set an aperture within the aperture range determined by the second determining device for a shooting in a low-resolution mode with a small number of pixels.

Another embodiment is presented below for using the lens at outside the range for securing the capability (an interlocking range which is wider than the normal taking range) corresponding with a taking condition.

Although the image quality around the screen is poorer as the diaphragm reaches to the aperture side, the subject often exists at the center of the screen at the time of a strobe taking, and the area around the screen is low with brightness; hence, the taken image is with a satisfactory quality even though the image quality is slightly poor due to low brightness at the periphery. In view of the fact, the extra aperture size is used at a time of the strobe taking in order to obtain a strobe reaching length.

In order to achieve the above-described objects, the present invention is directed to a camera, comprising: a diaphragm mechanism that adjusts an amount of light entering the camera through a taking lens; an electronic flash that emits auxiliary light to a subject at an exposure; a first determining device that determines an aperture range for a normal shooting without the electronic flash; and a second determining device that determines an aperture range for an electronic flash shooting with the electronic flash.

In this case, if the camera further comprises a photometry device, whether to use the extra aperture is preferably determined according to the measured subject distance. In other words, the camera takes the subject with the aperture size if a distance to the subject is a range in which the strobe can reach by the aperture size within the range for securing the capability, and takes with the extra aperture size if the distance to the subject is more than the range. In order to achieve the above-described objects, the present invention is directed to the camera further comprising: a pre-emitting device that illuminating the subject by emitting light before the exposure; a photometry device that performs photometry for each area of a divided taking screen when the pre-emitting device emits the light; and a determining device that determines whether to use the second determining device according to a result of the photometry by the photometry device. The extra aperture size is preferably used at the strobe taking only in a case the subject existing at the center of the screen is confirmed as a result of the dividing photometry by illuminating the subject with the pre-emitting means.

In order to achieve the above-described objects, the present invention is directed to the camera further comprising: an attaching part for a wide conversion lens; and a detecting device for detecting attachment of the wide conversion lens to the attaching part, wherein the camera uses the second determining device when the wide conversion lens is attached to the attaching part.

In a case where the wide conversion lens is attached to a lens barrel of the camera, the image is not problematic in a practical use even though the image quality at the periphery is poor because the strobe does not reach to the periphery due to its illuminating characteristics. Therefore, in one embodiment, the aperture size of the diaphragm which is outside the range that secures the capability (extra aperture size) is used when attaching the wide conversion lens.

In order to achieve the above-described objects, the present invention is directed to a camera, comprising: a taking lens; a diaphragm mechanism that adjusts an amount of light entering the camera through a taking lens; a first determining device that determines an aperture range for a normal shooting which secures predetermined optical capability; a second determining device that determines an aperture range including an aperture out of the aperture range for the normal shooting; a shooting mode setting device that sets a shooting mode; and a controlling device that controls the diaphragm mechanism to set an aperture within the aperture range according to the shooting mode selected by the shooting mode setting device.

For example, the second determining device is used when a portrait mode is selected.

Among types of taking modes for automatically setting a suitable taking condition corresponding with a taking scene, a portrait mode is satisfactory if the periphery of the image is blurred and thus the subject at the center stands out clearly. Thus, the image in the portrait mode is not problematic even though the image quality of the periphery is poor, and the aperture size of the diaphragm at outside the range for securing the capability is used.

In order to achieve the above-described objects, the present invention is directed to a camera, comprising: a taking lens that forms a subject image on an imaging surface; a taking lens controlling device that adjusts a position of the taking lens; a resolution changing device that changes a resolution of an image; a first determining device that determines an area of the taking lens for a shooting with a high resolution; and a second determining device that determines an area of the taking lens for a shooting with a low resolution.

In order to achieve the above-described objects, the present invention is directed to a camera, comprising: a taking lens; an imaging device that changes an optical image of a subject which enters the camera through the taking lens into electric signals; an electronic zooming device that obtains an enlarged image by electronically processing image signals obtained through the imaging device; a taking lens controlling device that adjusts a position of the taking lens; a first determining device that determines a range of the taking lens for a normal shooting without the electronic zooming device; and a second determining device that determines a range of the taking lens for an electronic zooming with the electronic zooming device.

A macro area of a focus position which is adjustable by focusing is normally regulated because a resolution of the entire image and a resolution of the periphery of the image and distortion are large. However, a taken image is not affected at a time of taking under a low resolution, or at a time of an electronic zoom (enlarging process of an image by processing an image signal); hence a taking is possible at even a shorter distance than the regulated range (focus point-blank limit).

In order to achieve the above-described objects, the present invention is directed to a camera, comprising: a taking lens; an imaging device that changes an optical image of a subject which enters the camera through the taking lens into electric signals; a focal length controlling device that adjusts a focal length of the taking lens; a resolution changing device that changes a resolution of an image; a first determining device that determines a focal-length area of the taking lens for a shooting with a high resolution; and a second determining device that determines a focal-length area of the taking lens for a shooting with a low resolution.

In order to achieve the above-described objects, the present invention is directed to a camera, comprising: a taking lens; an imaging device that changes an optical image of a subject which enters the camera through the taking lens into electric signals; an electronic zooming device that obtains an enlarged image by electronically processing image signals obtained through the imaging device; a focal length controlling device that adjusts a focal length of the taking lens; a first determining device that determines a focal-length area of the taking lens for a normal shooting without the electronic zooming device; and a second determining device that determines a focal-length area of the taking lens for an electronic zooming shooting with the electronic zooming device.

With a zoom lens, an optical telephoto end is often regulated by lens capability, but the image is not affected if taken in the low resolution mode or in the electronic zoom; thus a taking at a position closer to the optical telephoto side than a taking by changing a normal focal length is possible.

In order to achieve the above-described objects, the present invention is directed to a camera, comprising: a taking lens; a diaphragm mechanism that adjusts an amount of light entering the camera through the taking lens; a vibration amount determining device that determines an amount of vibration of the camera; a storing device that stores optical data related to the taking lens; and a controlling device that compares the amount of vibration determined by the vibration amount determining device with the optical data, and changes an aperture according to a result of comparison.

If the focal length of the taking lens is at the telephoto side, vibrations, for example by hands, easily occurs. However, if an image is taken in the low resolution mode, such vibrations are not obvious. Therefore, an amount of blur in the image caused by the vibrations is calculated and the result of the calculation is compared with the image quality data in an extra aperture. If the amount of blur by vibrations is larger than the image quality data in the extra aperture, the shutter speed is accelerated by using the extra aperture size so as to take the image at a point where the vibrations and the image quality are balanced.

A contour intensity is preferably controlled so that lowering of the resolution due to a lowered image quality of the optical system is supplemented and that an edging is stricter with respect to the image signal.

In order to achieve the above-described objects, the present invention is directed to a method for controlling an edging, wherein: a camera comprises an imaging device that changes an optical image of a subject which enters the camera through a taking lens into electric signals, and an edging device that performs the edging for an image obtained by the imaging device; and a control amount for deciding a degree of the edging the edging device is changed in response to one of the following conditions: an aperture, a position of the taking lens, and a focal length of the taking lens. The edging can be controlled by changing a circuit gain of the edging circuit or changing a coring level.

In order to achieve the above-described objects, the present invention is directed to a solid-state imaging device in which a large number of photoelectric converting devices are arranged and a micro lens is arranged at a front part of each of the photoelectric converting devices, wherein an aperture rate of each micro lens is changed in accordance with a position of the micro lens. This prevents a decrease of the image quality at the periphery of the display.

The aperture rate is preferably smaller toward periphery of a light receiving surface of the solid-state imaging device. Among the micro lenses arranged at the solid-state imaging device, the aperture rate of the micro lens which is arranged at the peripheral portion is smaller than that of the micro lens which is arranged at the central portion, whereby the decrease of the image quality at the periphery of the display can be prohibited.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a front perspective view of a camera in an embodiment of the present invention;

FIG. 2 is a rear perspective view of the camera in FIG. 1;

FIG. 7 is an explanatory view of a relationship between a view angle and a detected area at a time of an AF;

FIG. 21 is a graph showing a relationship (in a taking under a low resolution) between a focus position and the MTF;

DETAILED DESCRIPTION OF THE PREFERRED EMBODIMENTS

Figure 3:
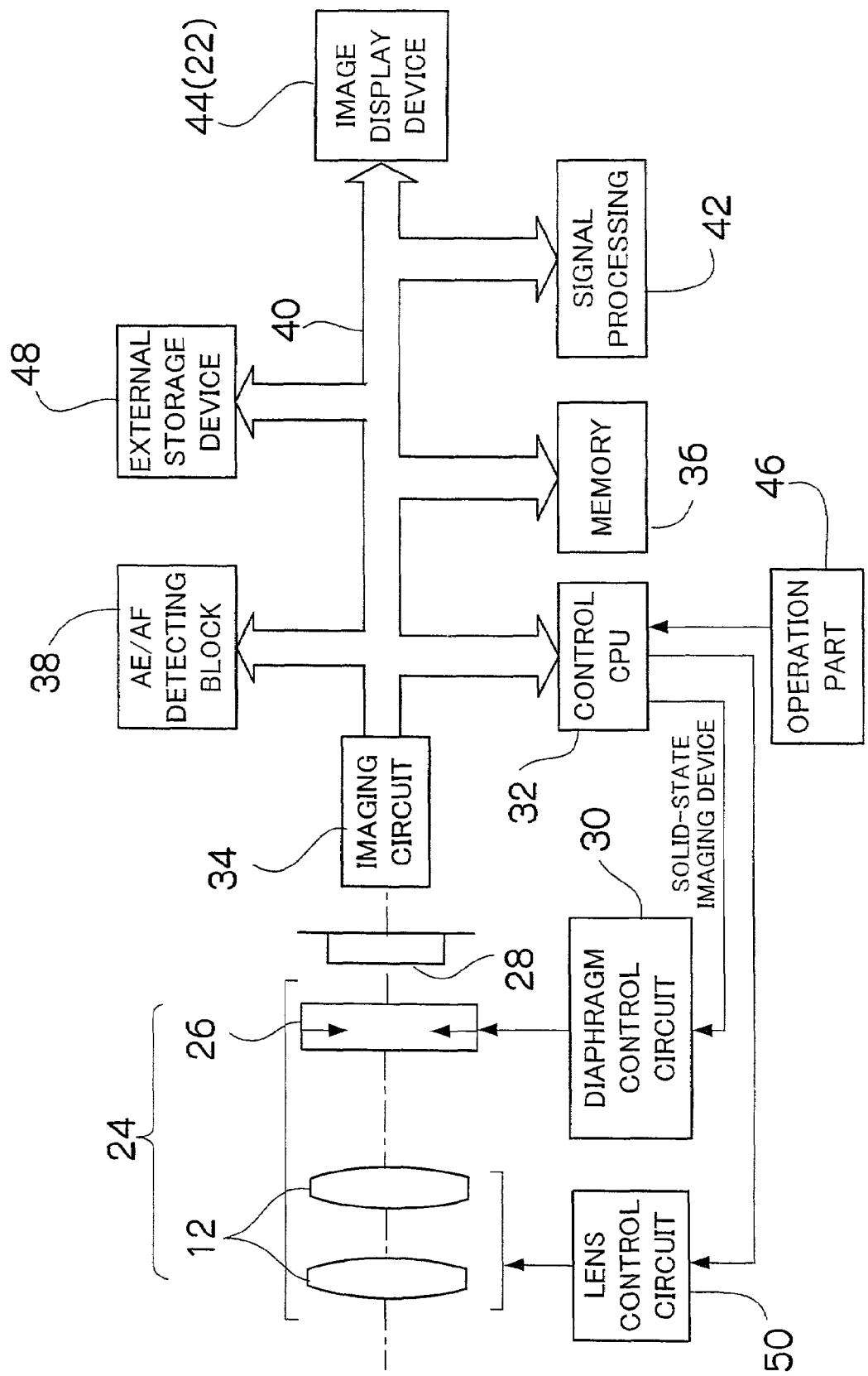
FIG. 3 is a block diagram of the camera in the embodiment of the present invention.

Hereunder preferred embodiments for a method and apparatus for controlling a diaphragm of a camera will be described in detail according to the accompanied drawings.

FIG. 1 is a perspective view at the front of the camera in an embodiment of the present invention. As seen from FIG. 1, a camera 10 has a taking lens 12 at substantially the center of its front, and a solid-state imaging device (in FIG. 3 a reference number 28 is assigned to the solid-state imaging device) such as a CCD image sensor is disposed at the rear of the taking lens 12. A strobe emitting part 14 and a finder object aperture 16 are provided to the front face of the camera 10, and a release switch 18 is provided on the ceiling (top face) of the camera 10.

FIG. 2 is a rear perspective view of the camera 10. An optical finder 20 and a liquid crystal monitor 22 are provided to the rear face of the camera 10. A photographer decides a taking angle (composition of a view) while looking at a video image (a real time image for confirming a view angle) which is displayed on the optical finder 20 or the liquid crystal monitor 22, and performs taking.

FIG. 3 is a block diagram showing a structure of the camera 10. An iris diaphragm 26 is disposed within an optical unit 24 which includes the taking lens 12, and a solid-state imaging device 28 is disposed at the rear of the optical unit 24. The iris diaphragm 26 is operated via a diaphragm control circuit 30, which is controlled by a control CPU 32.

An amount of light going through the taking lens 12 is adjusted by the iris diaphragm 26, and the light enters into the solid-state imaging device 28. Photo sensors are arranged in serial on a plane, and the subject image formed on a light receiving surface of the solid-state imaging device 28 is converted by each of the photo sensors into signal charge in an amount corresponding with an amount of entered light. The signal charge thus accumulated is sequentially read out as a voltage signal corresponding with the signal charge, by pulses supplied from the imaging device operating circuit, which is not shown.

The solid-state imaging device 28 has so-called an electronic shutter function which controls a charge accumulation time (i.e. shutter speed) of each of the photo sensors by a shutter gate pulse. Exposure is controlled by the combination of the iris diaphragm 26 and the electronic shutter of the solid-state imaging device 28. The image signal outputted from the solid-state imaging device 28 is processed in an imaging circuit 34, which includes circuits such as a color separation circuit, a gain switch circuit, a γ (gamma) process circuit, and an A/D converting circuit.

The signal which is converted from an analog form to a digital form in the imaging circuit 34 is stored in a memory 36 and an AE/AF detecting block 38. The image signal having stored once in the memory 36 is transmitted to the AE/AF detecting block 38 which detects a level of the inputted image signal and brightness data of the subject is obtained. A band pass filter is also provided to an AF detecting and processing part of the AE/AF detecting block 38, and a focusing condition of the subject is detected by extracting high frequency composition of the video signal. The AE/AF detecting block 38 in the present embodiment processes the digital signal, but the video signal may also be detected in an analog signal.

The data stored in the memory 36 is transmitted to a signal processing part 42 via a bas 40. The signal processing part 42 is an image signal processing means which includes a brightness and color difference signal producing circuit, a sharpness correcting (contour correcting) circuit, a white balance correcting circuit, a compression-expansion circuit, and so forth, and processes the image signal in accordance with a command from the CPU 32. The image data inputted into the signal processing part 42 is converted into a brightness signal (Y signal) and a color difference signal (Cr and Cb signals) while going through a predetermined processes such as the gamma correction, and then stored in the memory 36.

The image data stored in the memory 36 is read out in accordance with the command of the CPU 32 and is converted into a signal in a predetermined display format (e.g. a color composition video signal of an NTSC format), then is outputted to an image display device 44 such as the liquid crystal monitor 22. The image display device 44 is not limited to the liquid crystal monitor 22 which is built in the camera 10, but may be an output terminal (not shown), or a liquid crystal display or a CRT which is connected through a wired or a radio communication interface and the like.

The data in the memory 36 is periodically updated by the image signal outputted from the solid-state imaging device 28, and the video signal produced from the image data is supplied to the image display device 44; whereby an image captured by the solid-state imaging device 28 is displayed on the image display device as a moving image at a real time, or as a series of images even though not in the real time.

A signal for instructing start of recording is produced by pressing down the release switch 18 which is included in an operation part 46, and taking of the image data to be recorded is started in response to receiving of the instruction signal. By the taking operation in response to pressing down the release switch 18, the data taken in the memory 36 goes through predetermined processes such as compressing and expanding and is recorded in an external storage device 48.

A memory card such as a smart media (Solid-State Floppy Disk Card) is used for the external storage device 48. Record medium is not limited only to the smart media, but may be a PC card, a compact flash, a magnetic disk, an optical disk, an optical magnetic disk, a memory stick, and so forth, and also a variety of types of media may be used which is readable and recordable in accordance with an electronic, a magnetic, or an optical format, or combinations of them. In such use, a signal processing means and an interface corresponding with a medium to be used is applied. Moreover, plural media may be attachable to the camera 10 regardless of types of record media. A means for storing the image data is not limited to a movable media which is detachable from the camera, but may be a record media (an inner memory) which is built in the camera. When storing the image in the inner memory, a communication interface is provided for transferring the data to external equipment such as a personal computer.

In a reproduction mode, the image data read out from the external storage device 48 is expanded by the compression-expansion circuit and is outputted to the image display device 44.

The CPU 32 is a control part which controls the respective circuits of the present camera system and is provided with a storage means such as a ROM and a RAM (not shown). ROM stores a program to be processed by the CPU 32 and types of data required for controlling the circuits, whereas the RAM is used for the CPU 32 as an operating area for performing respective calculations. The CPU 32 controls operations of a corresponding circuit in accordance with an input signal received from the operating part 46, and at the same time controls display of the image display device 44, an AF, and AE.

The operating part 46 is a block which includes an instruction input means such as the release switch 18, a mode selection dial, an up/down key, and a left/right key. The operating part 46 is not limited to a pressing switch, a dial, a lever switch, and a slide switch; a desired items may be selected from a setting menu and a selecting items displayed on a screen of the image display device 44 by using a cursor, a pointer, a touch panel, and the like on the screen. The operating part 46 includes a means for designating a number of image pixels at a time of image recording, a means for switching ON/OFF of the electronic zoom function, a means for operating a magnification of the electronic zoom, and so forth. The operating part 46 may be provided to the camera, or a part or the entire operating part 46 may be separated from the camera as a remote control transmitter.

The CPU 32 performs the respective calculations such as AF evaluation and AE calculation based on the data from the AE/AF detecting block 38, and controls the lens control circuit 50 so as to move the taking lens 12 at a focusing position while controlling the diaphragm control circuit 30 to set an appropriate focus and at the same time controlling the charge accumulation time of the solid-state imaging device 28.

The iris diaphragm 26 in the camera 10 of the present embodiment can be changed between F1.4-F11, but a range for securing the capability to satisfy a predetermined optical capability is between F2.8-F8. In general, an image quality at the periphery of the image is lowered if the diaphragm is opened large, and the image is blurred, which is undesirable. Thus, when taking the image to be recorded, a taking is executed in accordance with a program line which uses the range F2.8-F8 (a normal taking range) which satisfies the predetermined optical capability.

Figure 4:
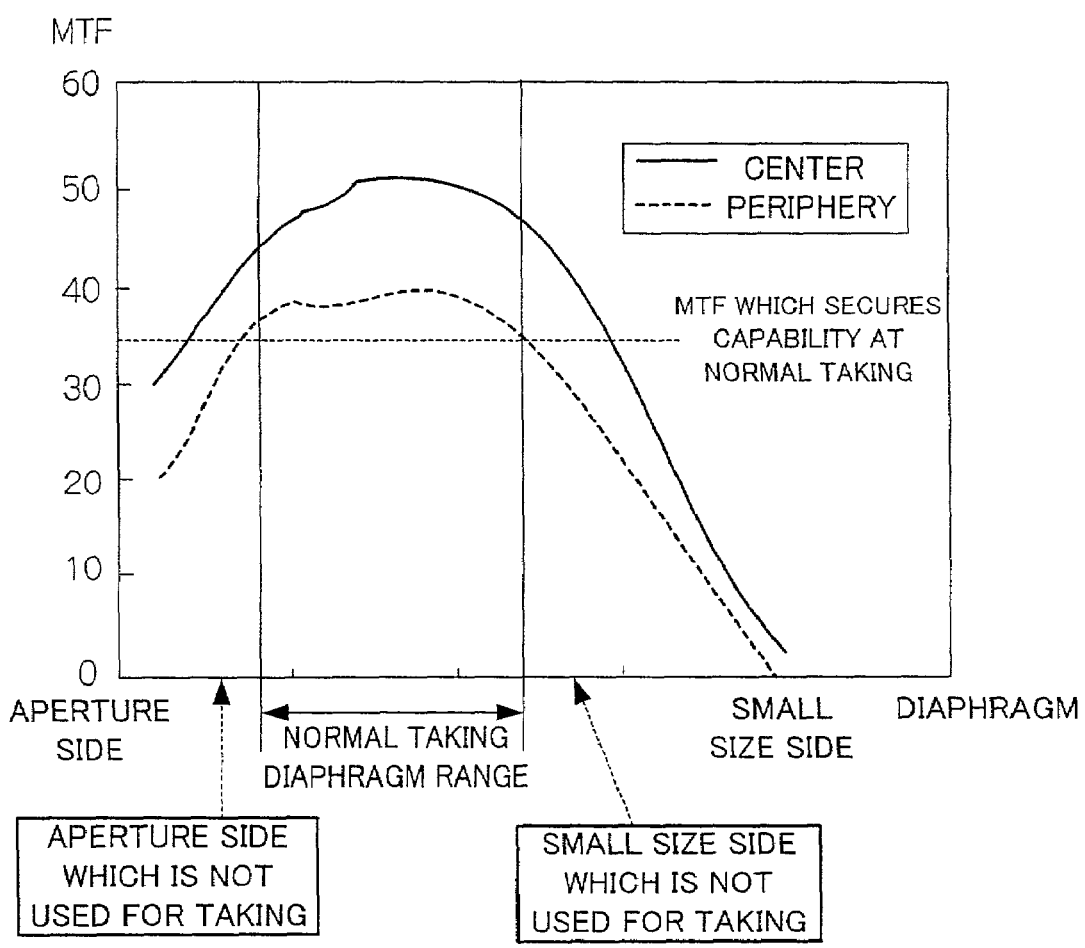
FIG. 4 is a graph showing changes in MTF by a diaphragm.

Although the image quality at the periphery is lowered if the diaphragm is opened, the image quality at the center is almost unaffected. Therefore, respective capability of the camera can be achieved by changing the diaphragm control under each of the conditions described below. In other words, the lens capability is generally the best at the center of the screen and is lowered toward the periphery. The capability is also changed by the diaphragm. FIG. 4 is a graph showing changes of an MTF (Modulation Transfer Function) of the lens by the diaphragm. In FIG. 4, a solid-lined graph shows the MTF changes at the center of the screen while a graph with a dotted line shows the MTF changes at the periphery of the screen.

As shown in FIG. 4, lowering of the capability is observed at both aperture side and the small size side. Assuming that the MTF which can secure the capability is 35%, a camera is designed to have a portion in which the MTF capability satisfies 35% of the entire area of the screen including the periphery is "a normal taking diaphragm range". However, the MTF (the solid-lined graph) at the center of the screen has a part which achieves a better capability (a part which is higher than 35%) than the normal taking focus range with respect to the aperture side and the small size side. The camera 10 in the present embodiment uses the aperture size which is outside the normal taking focus range since AE detection is not affected even though the MTF is lowered.

Figure 5:
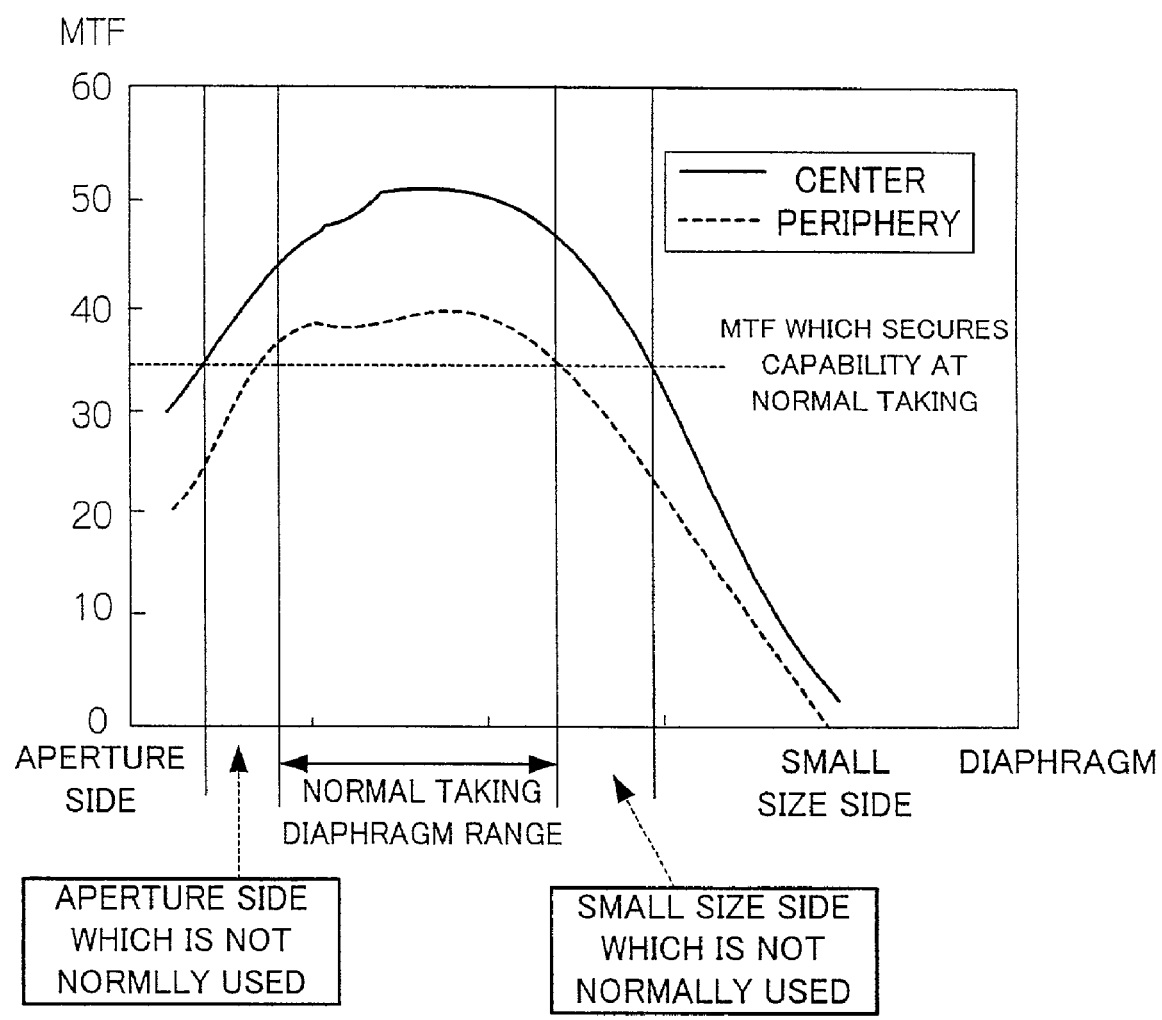
FIG. 5 is a graph showing enlarging of a focus area which can secure capability when using an electronic zoom.

If only a portion up to the center of the lens is used in a case of the electronic zoom, the focus range which can be used (a range in which the MTF satisfies 35%) is wider than the normal taking focus range as seen from FIG. 5. Although not shown in the drawings, the portion of the MTF graph between the center and the periphery resides in between the solid-lined graph and the dotted line graph; thus the focus range which secures the capability changes corresponding with the zoom magnification of the electronic zoom.

Figure 6:
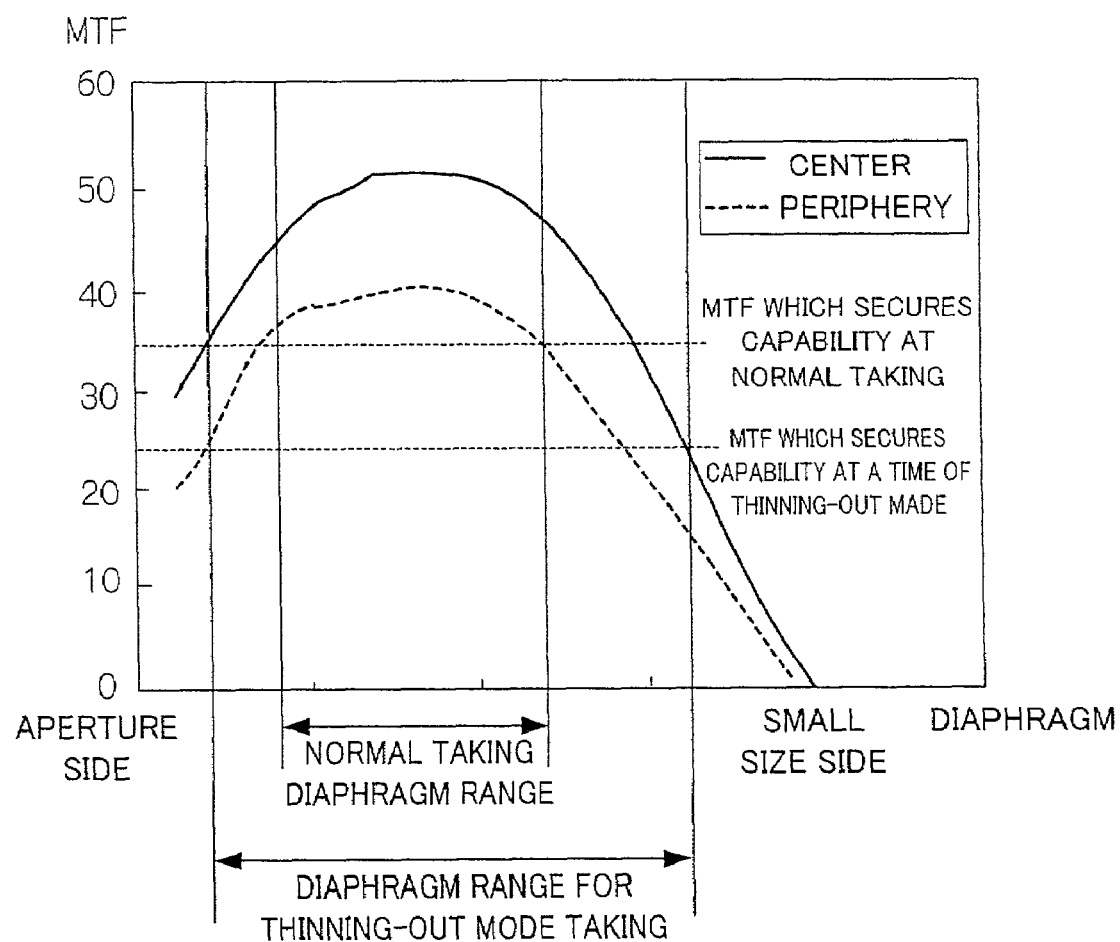
FIG. 6 is a graph showing enlarging of the focus area which can be used in a thinning out mode.

In a case of taking an image by thinning out the pixels in accordance with a constant thinning out ratio rather than with a recording mode for recording all the pixels of the solid-state imaging device 28, the acceptable MTF is lowered from the lens side. Thus as seen from FIG. 6, a focus range which is wider than a normal taking range (a focus range for the thinning-out mode taking) can be used at a time of the thinning-out mode taking. Outputs from the solid-state imaging device 28 are thinned out not only for the thinning-out taking but also for displaying the moving image; hence the aperture size of the diaphragm at the aperture side and the aperture size at the small size side which are outside the normal taking focus range can be used in the same manner described above.

If the subject is too dark and so the moving image is dark, the moving image can be displayed bright by using the aperture size which is closer to the aperture side than the normal taking focus range. In contrast, if the subject is so bright that smears easily occur, the quality as well as observability of the moving image can be improved by using the aperture size which is closer to the small aperture size than the normal taking focus range.

To be described in more detail, the present invention improves the respective capability of the camera by controlling the diaphragm with regard to the situations presented in embodiments 1 through 6, which may be combined if necessary.

<Embodiment 1> Extra Aperture Size at a Time of AF

The auto focus adjustment (AF) of the electronic camera is usually controlled to make the point where the high frequency compositions of the video signal from the imaging device reach at the maximum point as the focus point. When taking a moving image, the taken image is dark under low brightness; hence, a subject under low brightness to some extent does not have problems without a precise focus.

With the still camera, on the other hand, a flashing device such as a strobe is used which emits light in synchronism with an exposure operation at a time of recording so that a bright image can be photographed. In the AF, however, the flashing device does not emit light besides the precise focus cannot be obtained. If the flashing device emits light, the time for emitting light is shorter than the time required for the AF process, and the precise focus is not yet obtained. Concerning the above-described problems, the conventional art achieved the AF by illuminating auxiliary light at the time of the AF, or by increasing the gains of outputs from the solid-state imaging device so as to amplify the signal.

However, the auxiliary light requires a light source other than the original light source which is exclusively used for the auxiliary light, and its electricity consumption is considerably large. Since a method for amplifying the signal from the solid-state imaging device by a gaining means also amplifies noise compositions, focusing capability is poor.

In view of the above, the camera 10 of the present embodiment is provided with a focus position having an extra large aperture size, which is not used for photographing ("the extra aperture size", which means a focus position that is outside the specified range). The camera is so controlled as to increase an amount of light to the solid-state imaging device 28 by using the extra aperture size under low brightness, whereby the noise compositions can be suppressed while the AF capability under low brightness can be improved.

FIG. 7 shows a relationship between the view angle and a detected area at a time of the AF. As seen from FIG. 7, only an area (an AF detect area 62) is used which is one quarter of the center of the screen with respect to a view angle 60 at a time of taking (hereunder called a view angle 60 at taking) at a time of the AF; hence an image is satisfactory if the image quality is secured by the AF detect area 62.

Therefore, light in an amount that is four times as the normal taking can be provided and at the same time the capability at the low brightness side can be improved by four times, by capturing the image in the AF process with the aperture size (e.g. F1.4) which provides more brightness than the aperture size (F2.8) which is used for the view angle 60 at taking.

Figure 8:
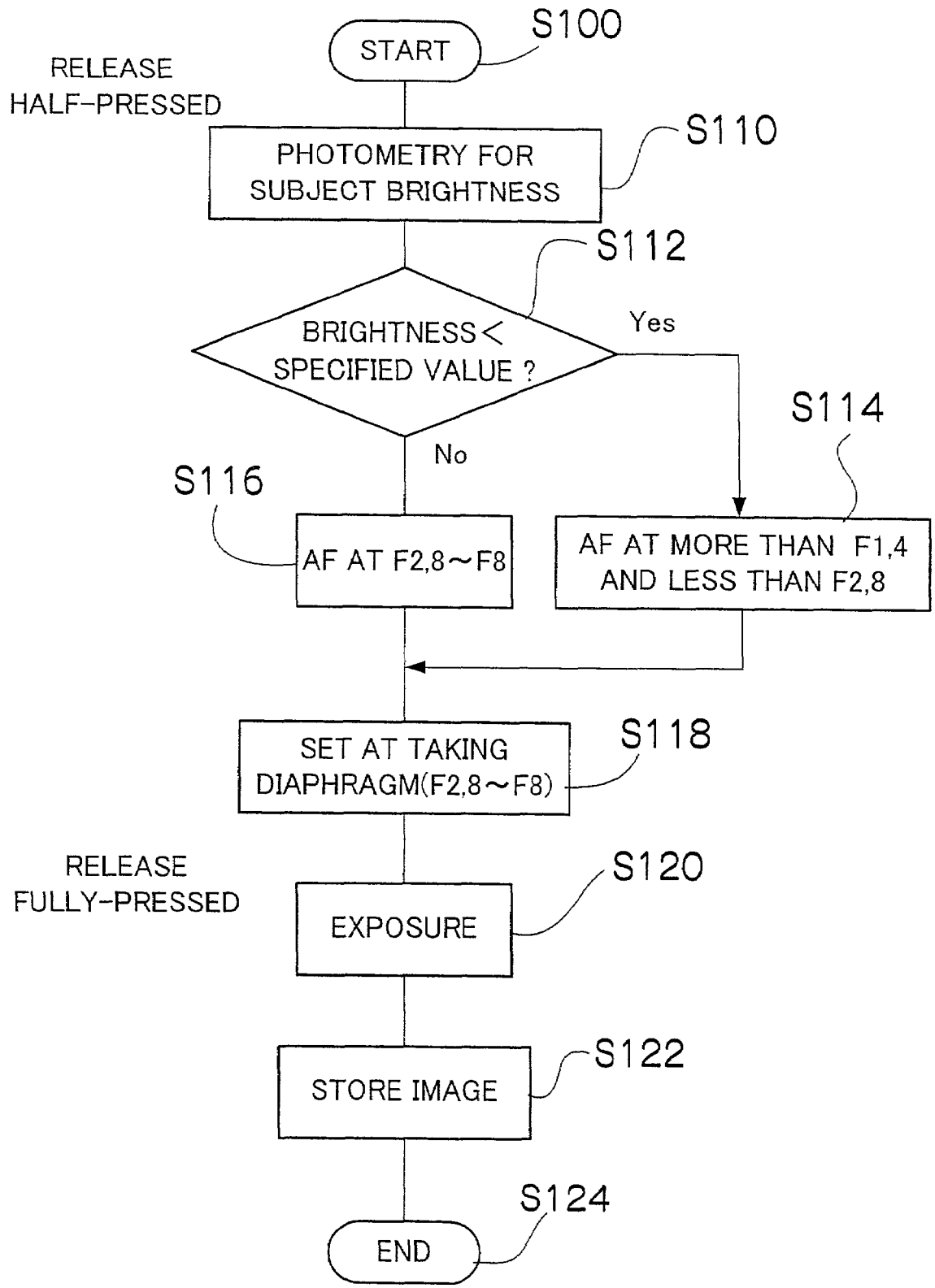
FIG. 8 is a flowchart showing a procedure for controlling the camera in a first embodiment.

FIG. 8 shows a control flowchart for executing the above-described process. When the camera control starts (Step S100) and the release switch 18 is half-pressed, the AF process starts, and photometry for the subject brightness is performed in order to measure the brightness of the subject (Step S110). Then, the subject brightness which is obtained by the photometry and a specified value are compared (Step S112). If a normal aperture size is used when the subject brightness is lower than the specified value, the AF is determined to operate abnormally due to a small output of the solid-state imaging device 28, and the process is separated to Step S114.

At Step S114, an aperture size of diaphragm is selected which is determined to obtain the video signal most properly in the focus range (F1.4 or more and less than F2.8) which is closer to the aperture side than the normal diaphragm operation range, and the AF process is executed with the aperture size of the diaphragm.

At Step S112, on the other hand, the AF is determined to operate normally within the normal diaphragm operation range if the subject brightness is larger than the specified value, and the process goes on to Step S116. At Step S116, an appropriate aperture size is selected within the normal diaphragm operation range, that is, between F2.8-F8, and the AF process is executed by the focus value.

After the AF process is performed at Step S114 or Step S116, the process goes on to Step S118. At Step S118, an aperture size for a normal taking (taking for recording) is calculated from a photometry value obtained at the photometry for the subject brightness and a predetermined program line, and the aperture size is set in accordance with a result of the calculation. At that time, the aperture size within the normal diaphragm operation range (F2.8-F8) is selected.

Then, an exposure operation is performed when the release switch 18 is fully pressed (Step S120). The image data obtained at the exposure operation is stored in the external storage device 48 after going through required signal processes (Step S122), and the control sequence is completed (Step S124).

In the present embodiment, an electronic still camera is mentioned as one example, however, cameras such as a silver-halide camera which records an optical image in photosensitive material such as a photographic film can be used if it applies an AF method of TTL and the same result can be obtained.

<Embodiment 2> Extra Aperture Size at a Time of AE

The automatic exposure control (AE) of the electronic camera is controlled in which a level of a video signal from the imaging device is integrated in a predetermined area so that an average brightness value is a proper level. In the conventional art, an exposure under low brightness is calculated by increasing an output gain from the imaging device so as to amplify the signal if the subject is too dark; but the method also amplifies noise compositions and thus lowers photometry capability.

Concerning the above problem, the camera 10 of the present embodiment uses the extra aperture size when the brightness is low so that an amount of light to the solid-state imaging device 28 increases. Thus, the noise compositions can be suppressed and at the same time the photometry capability under low brightness can be improved.

Figure 9:
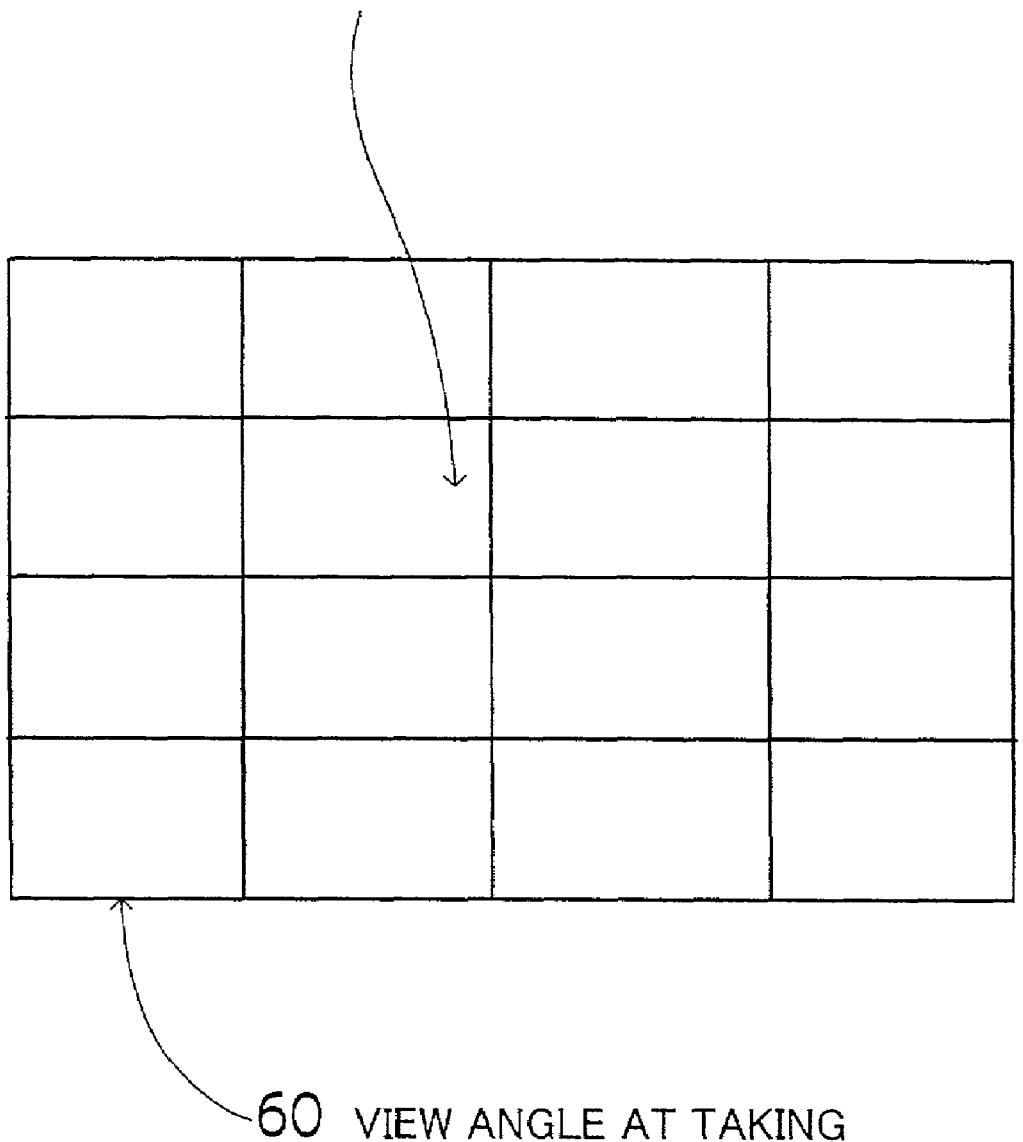
FIG. 9 is an explanatory view of a relationship between the view angle and an area which is detected by an AE dividing and photometry.

FIG. 9 shows a relationship between the view angle at taking and a divided photometry detect area of AE. FIG. 9 shows an example in which the screen is divided into sixteen areas (4×4=16), but manners of dividing are not limited; for example, the area can be divided into 256 areas (16×16=256). If a method for the photometry of AE measures an average brightness of each of the divided photometry detect areas 64, a calculation for photometry is not affected by that despite that deterioration of the image quality such as blur occurs at the periphery of the screen, because the signals are averaged.

Therefore, light in an amount that is four times as the normal taking can be provided and at the same time the capability at the low brightness side can be improved by four times, by performing the AE process with the aperture size (e.g. F1.4) which provides more brightness than the aperture size (F2.8) which is used for the view angle 60 at taking.

Figure 10:
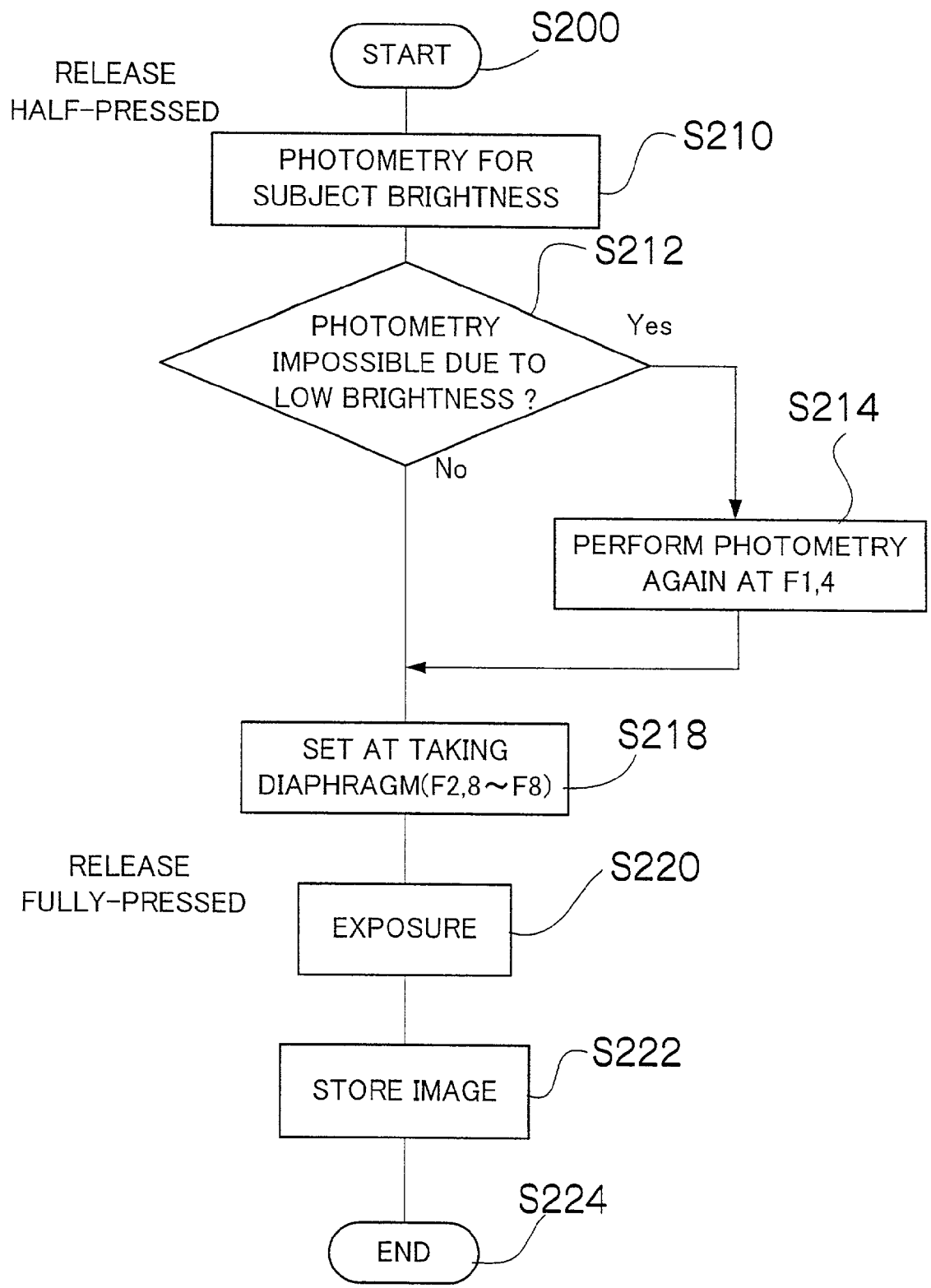
FIG. 10 is a flowchart showing a procedure for controlling the camera in a second embodiment.

FIG. 10 shows a control flowchart for executing the method. When the camera control starts (Step S200) and the AE process starts by half-pressing the release switch 18, the photometry for subject brightness for measuring the brightness of the subject is performed (Step S210). The subject brightness obtained by the photometry and the specified value are compared, and whether or not the brightness is at a measurable level is determined (Step S212).

If the subject brightness is determined to be extremely dark and the AE photometry cannot be performed normally with the normal aperture size due to small outputs of the solid-state imaging device 28, the process goes on to Step S214. At Step S214, the extra aperture size of F1.4 is selected which is an aperture size at outside the normal diaphragm operation range, and the photometry is performed again with the aperture size.

The process afterwards goes on to Step S218, and an aperture size at a time of taking and a shutter speed are calculated from a photometry value obtained by the last photometry and a program line, and the aperture size is set in accordance with a result of the calculation. At that time, the iris within the normal iris operation range (F2.8-F8) is selected. The image is darker with the aperture size at taking than the image with the aperture size at the photometry (extra aperture size). However, if the subject brightness is determined to be a level at which the subject brightness can be measured at Step S212, the process goes on to Step S218, the iris for a normal taking (taking for recording) is calculated from the photometry value obtained at the subject brightness photometry and the predetermined program line, and the iris is set in accordance with the result of the calculation.

After that, the exposure operation is performed (Step S220) after pressing the release switch 18, and the image data obtained at the exposure operation is stored in the external storage device after going through the required signal processes (Step S222), then the control sequence is completed (Step S224).

When using the extra aperture size, lowering of the amount of light at the periphery of the screen may occur in addition to the blurring phenomenon. Concerning the phenomena, the data showing a trend of lowering of the amount of light at the periphery is preferably stored in the ROM and the like, and correction is performed by using the data at a time of the AE with the extra aperture size.

<Embodiment 3> Extra Aperture Size at a Time of the Electronic Zoom

An electronic camera has an electronic zoom function (also called a digital zoom function) which enlarges only the center of the screen by an electronic process and takes the expanded image. When the enlarging process is performed by the electronic zoom function, vibrations easily occur due to a pseudo focal length which is long.

In general, a limit of the shutter speed without vibrations is 1/(focal length: millimeter). For example, the limit of the shutter speed without vibrations is 1/100 seconds if the focal length is 100 mm. When the electronic zoom magnification is twice, the focal length is two times long, so the focal length is 200 mm with the camera with the focal length 100 mm. The limit of the shutter speed without vibrations is 1/200 seconds, which means the vibrations more easily occur.

As described in reference to FIG. 5, the camera 10 of the present embodiment concerns that only the center of the screen is a taking area at a time of the electronic zoom, and is thus controlled to increase the amount of light to the solid-state imaging device 28 by using the extra aperture size. Therefore, the shutter speed can be accelerated while the vibrations can be eliminated.

Figure 11:
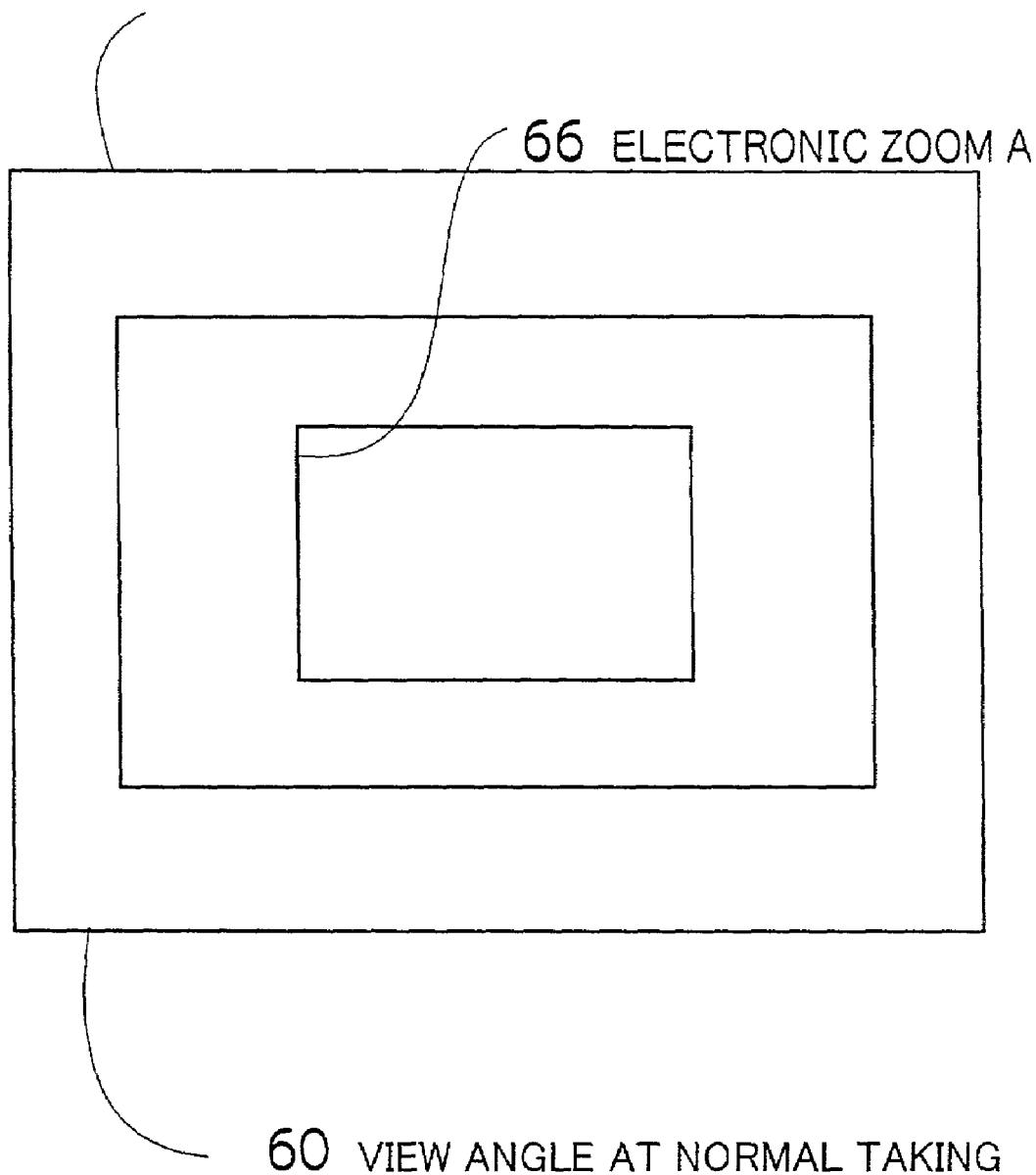
FIG. 11 is an explanatory view of a relationship between a normal view angle and a taking angle when using an electronic zoom.

FIG. 11 shows a relationship between the view angle at a time of normal taking and the view angle at a time of the electronic zoom. In contrast to the view angle 60 at a time of normal taking which does not use the electronic zoom, the image quality can be secured in the area 66 when using an electronic zoom A since the electronic zoom A uses only the area 66 which is one quarter of the center of the screen. Therefore, the amount of light to the solid-state imaging device 28 can be increased by four times by setting a brighter iris (e.g. F1.4) than the iris with F2.8 which is used for the view angle 60 at a time of normal taking, hence the resulting shutter speed can be four times fast.

In a case of an electronic zoom B, an area indicated by a reference number 68 is a view angle at taking. Since the taking area 68 of the electronic zoom B is larger than that of the electronic zoom A, the image quality may not be secured with respect to the area that is a half of the center of the screen (an outer peripheral portion of the area 66 of the electronic zoom A) if setting the iris at F1.4. Concerning securing the image quality, the camera is controlled to use the iris at about F2.0 when using the electronic zoom B. Therefore, an accurate AF control is possible by changing the iris being used at the aperture side corresponding with a magnification of the electronic zoom.

Figure 12:
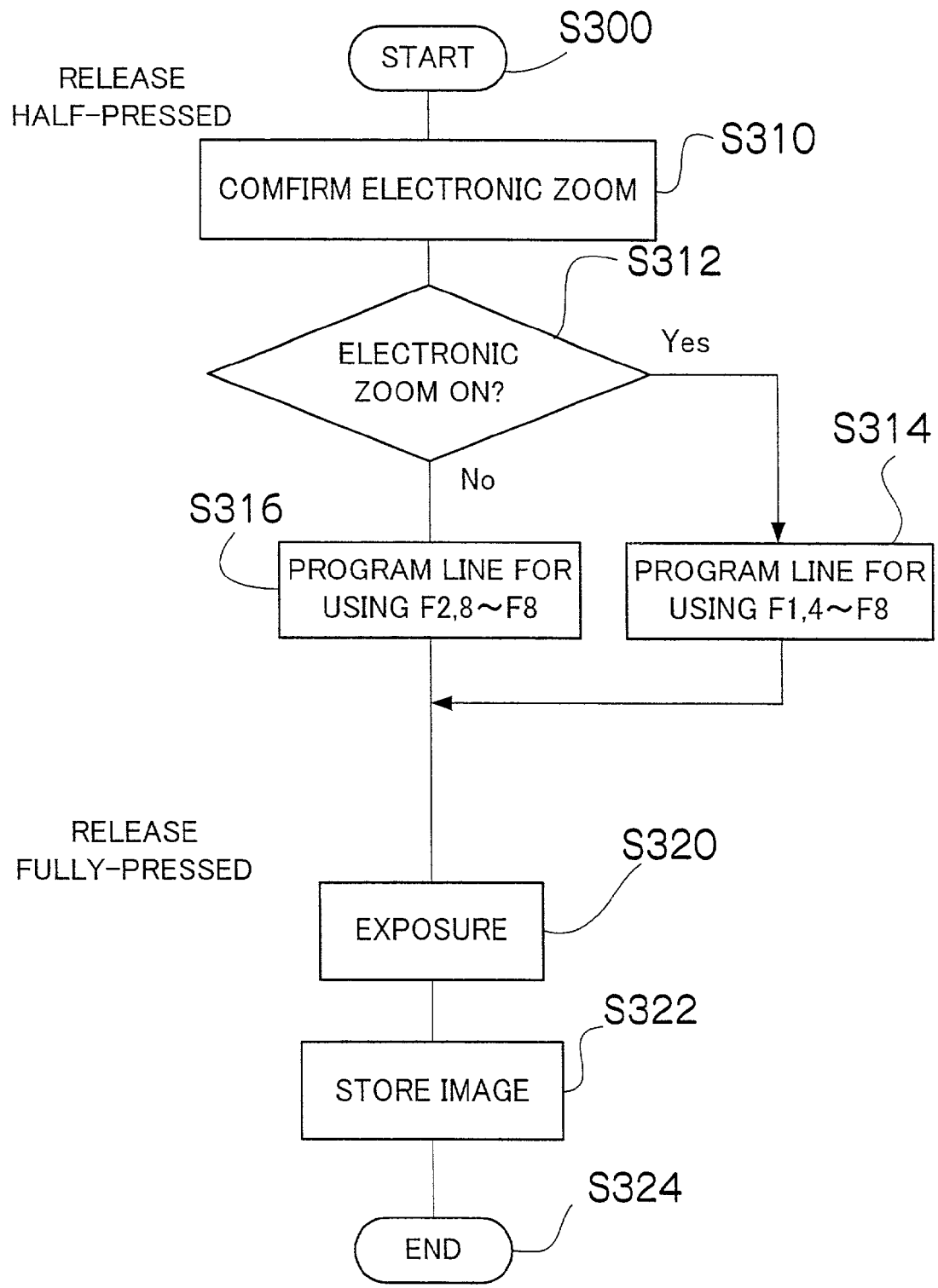
FIG. 12 is a flowchart showing a procedure for controlling the camera in a third embodiment.

FIG. 12 shows a control flowchart for executing the process. When the camera control starts (Step S300) and the release switch 18 is half-pressed, ON/OFF of the electronic zoom is confirmed (Step S310), then whether or not the electronic zoom is used is determined (Step S312). If the setting of the electronic zoom is ON, the step goes on to Step S314, and the extra aperture size (e.g. F1.4) is set corresponding with the magnification of the electronic zoom, and an iris at the time of taking and the shutter speed are calculated by following the program line for using the extra aperture size (F1.4) to F8, and the iris is set in accordance with a result of calculation.

On the other hand, if the setting of the electronic zoom is OFF at Step S312, the step goes on to Step S316, and the program line for using the normal iris operation range (in this case F2.8-8) is used.

Next, when the release switch 18 is fully pressed, the exposure operation is performed (Step S320), and the image data obtained at that time is stored (Step S322) in the external storage device after going through the required signal processes, and the control sequence is completed (Step S324).

<Embodiment 4> Extra Aperture Size for the Moving Image

A real time image (moving image) during taking is displayed in the electronic still camera in order to confirm a view angle. The imaging pixels have been improved, so the pixels are thinned out and displayed. In this case, as described with reference to FIG. 6, required optical capability (e.g. MTF) of the lens differs at the time of taking for recording a moving image and photographing a still image. In other words, superior optical capability is required at the time of recording a still image, but deterioration of the moving image when displayed is not concerned a lot even though the optical capability of the lens is decreased, because pixels are thinned out.

At a time of a normal taking for recording the still image, a bright image can be obtained by a flashing device which emits light in synchronism with exposure; but at a time of taking for recording the moving image, the taken image is dark under low brightness and the image cannot be confirmed because the output from the solid-state imaging device is lowered.

In order to cope with the above problem, the conventional art increased the output gain from the imaging device and amplified the signal in order to display the image under low brightness as a bright image. However, if the imaging signal is amplified, the noise composition is amplified and the image quality of the moving image is deteriorated.

Thus, the camera 10 of the present embodiment uses an extra aperture size with respect to the subject under low brightness at a time of taking the moving image so as to increase the amount of light to the solid-state imaging device 28; whereby the noise compositions are suppressed and at the same time the display for confirming the view angle under low brightness can be viewed to a section closer to the low brightness side.

Figure 13:
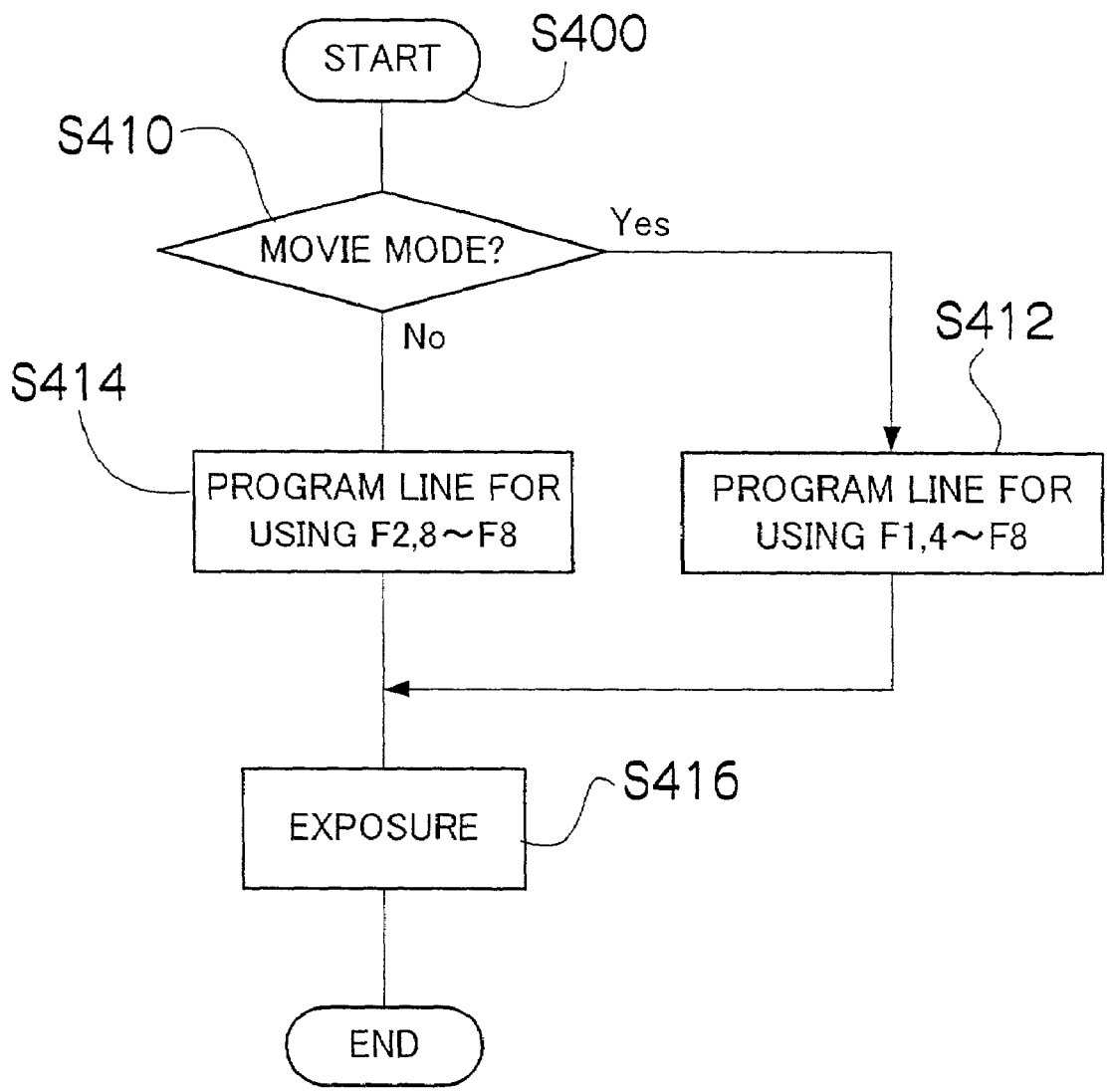
FIG. 13 is a flowchart showing a procedure for controlling the camera in a fourth embodiment.

FIG. 13 shows the control flowchart for executing the process. When the camera control starts (Step S400), whether the current operation is for taking a moving image or for a normal taking (Step S410). If the current operation is for taking a moving image, a program line in the iris range including the extra aperture size (e.g. F1.4) is used (Step S412) since a bright iris which lowers the optical capability but does not affect the displayed image can be used.

On the other hand, if the current operation at Step S410 is for the normal taking, a program line is used for deciding an exposure in a normal iris range (F2.8-F8) which secures the predetermined optical capability (Step S414). Then, the exposure is performed (Step S416) by an iris and a shutter speed which are obtained in accordance with the predetermined program line at Step S412 or at Step S414.

<Embodiment 5> Extra Aperture Size in a Low Resolution Mode

Since imaging pixels have been improved, an electronic still camera may have a high resolution mode for recording all the pixels without thinning out and a low resolution mode for recording after thinning out in order to reduce a size of an image file.

In that case, required optical capability of the lens differs in the high resolution mode and the low resolution mode. When taking by the high resolution mode, superior optical capability is required to the lens in order to obtain a high quality image by using the data of all the pixels; however, when taking by the low resolution mode, deterioration of the taken image quality may not be concerned a lot despite that the optical capability of the lens is lowered, because the pixels are thinned out.

Therefore, the camera 10 of the present embodiment is controlled to use the extra aperture size with respect to the subject under low brightness in the low resolution mode so as to increase the amount of light to the solid-state imaging device 28. Thereby the frequency of use of the strobe device is decreased and an image with a small amount of strobe light can be taken with an optimum exposure; moreover, electricity consumption of a power source battery can be decreased by the control.

Figure 14:
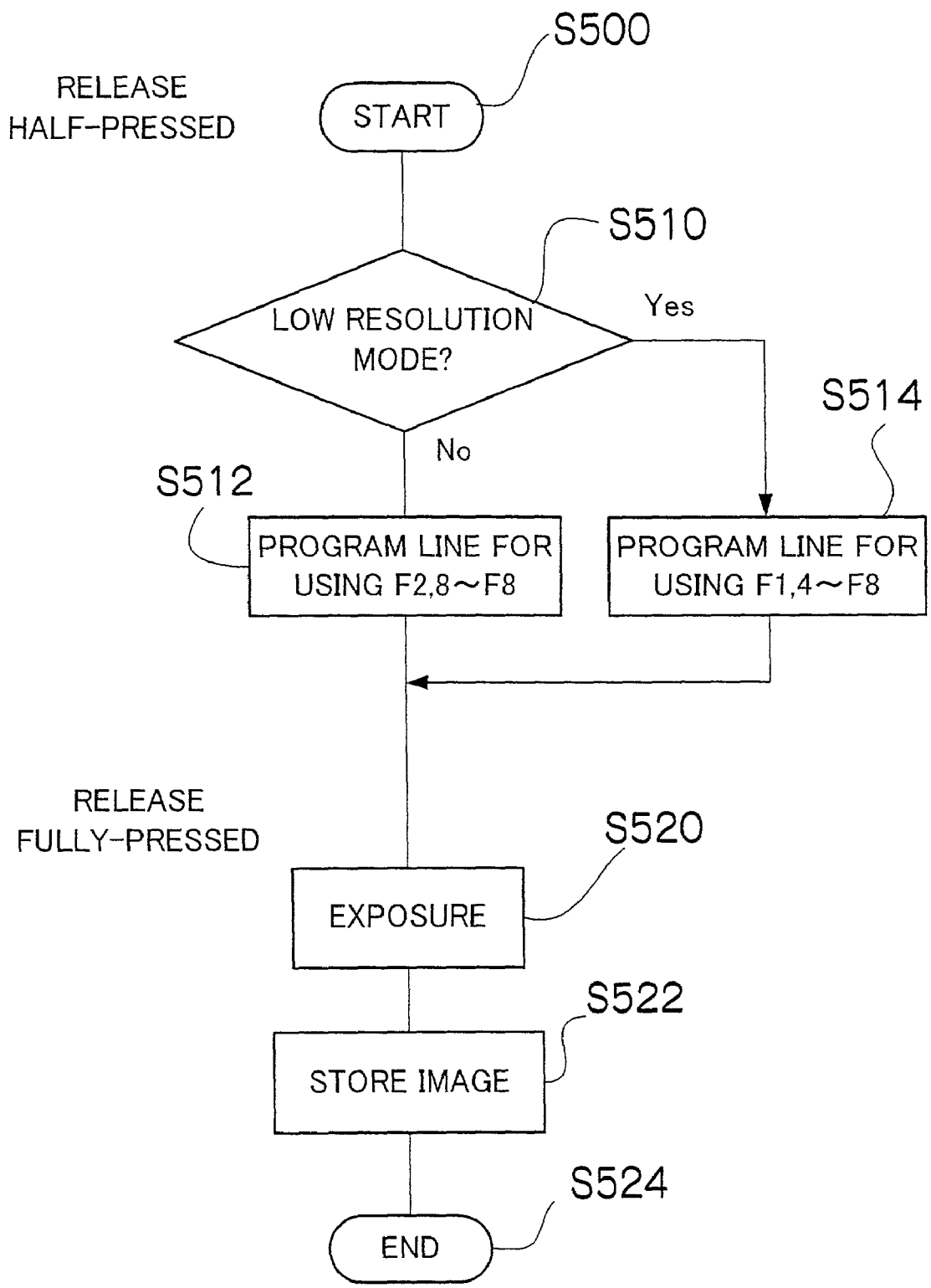
FIG. 14 is a flowchart showing a procedure for controlling the camera in a fifth embodiment.

FIG. 14 shows the control flowchart for executing the process. When the camera control starts (Step S500) and the release switch 18 is half-pressed, whether or not the current taking mode is set at the low resolution mode is determined (Step S510). If the current taking mode is set at the low resolution mode, a program line for deciding exposure in the focus range which includes the extra aperture size (e.g. F1.4) (Step S514) since an aperture size for providing more brightness is used which lowers the optical capability of the lens but does not affect the taken image.

Next, when the release switch 18 is fully pressed, the exposure operation is performed (Step S520) by an aperture size and a shutter speed which are obtained in accordance with a predetermined program line at Step S512 or Step S514. The image data obtained by the exposure is stored in the external storage device 48 after going through the required signal processes (Step S522), and the control sequence is completed (Step S524).

In a case where the low resolution mode is provided in plural levels corresponding with a thinning out rate, an area which allows deterioration of the image changes corresponding with the thinning out rate; thus the value of the extra aperture size is preferably changed corresponding with the thinning out rate.

<Embodiment 6> Extra Aperture Size for the Moving Image

The electronic still camera may display a moving image in purpose of confirming the image. The moving image is displayed by thinning out the pixels since the imaging pixels have been improved. In that case, the required optical capability of the lens differs for taking a moving image and a normal taking. In other words, deterioration of the displayed image may not be concerned a lot if the optical capability is lowered to some extent.

Moreover, if the subject under extreme brightness such as the sun or a light, a smear phenomenon is known to occur in which bright lines appear from the bottom to the top of the image of the subject under extreme brightness. If the smear occurs in a moving image for confirming the view angle, not only the quality of the image but also the observability of the displayed image is lowered. Although the smear can be eliminated by closing a mechanical shutter at a high speed in the normal taking, the mechanical shutter cannot be closed while taking a moving image.

In order to cope with this problem, the camera 10 of the present embodiment is provided with a focus position with an aperture of a size which is not used for the normal taking (hereunder called "an extra small size" which means the minimum focus position at outside the specified range). When taking a moving image, the extra small size is used so as to decrease the smear and at the same time the amount of light entering into the solid-state imaging device 28 is decreased, in order to improve the quality as well as observability of the moving image.

Figure 15:
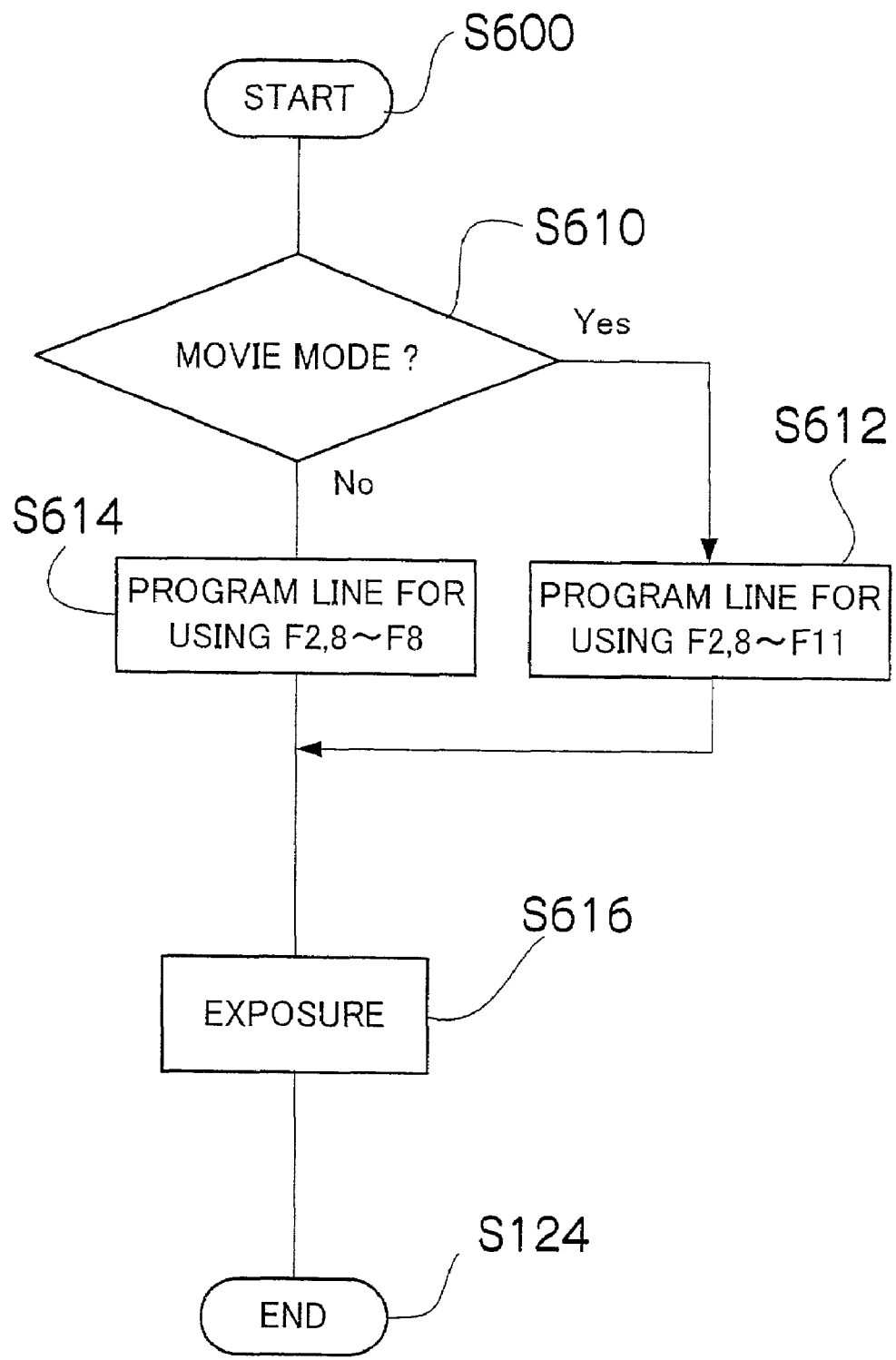
FIG. 15 is a flowchart showing a procedure for controlling the camera in a sixth embodiment.

FIG. 15 shows the control flowchart for executing the process. When the camera control starts (Step S600), whether the current operation is for taking the moving image or for the normal taking is determined (Step S610). If the current operation mode is for taking a moving image, a program line in the focus range including the extra aperture size (e.g. F11) is used (Step S612) since an aperture size can be used which lowers the optical capability but does not affect the displayed image.

On the other hand, if the current operation at Step S610 is for the normal taking, a program line is used for deciding an exposure in a normal focus range (F2.8-F8) which secures the predetermined optical capability (Step S614). Then, the exposure is performed (Step S616) by an aperture size and a shutter speed which are obtained in accordance with the predetermined program line at Step S612 or at Step S614.

In the embodiment, the iris diaphragm 26 is used as the diaphragm mechanism; but the diaphragm mechanism is not limited to the iris diaphragm 26 for achieving the present invention. Another diaphragm mechanism may also be used in which a predetermined aperture size is selected by rotating a turret plate having plural holes.

Now, alternative embodiments will hereunder be described for improving the capability of the camera by focusing on elements other than the diaphragm.

Alternative Embodiment 1

Figure 16:
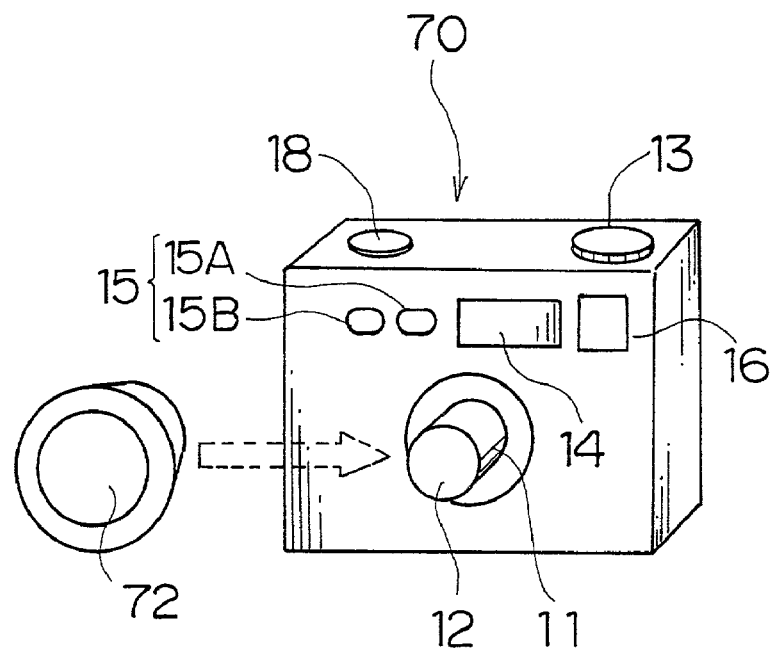
FIG. 16 is a front perspective view of the camera in another embodiment of the present invention.
Figure 17:
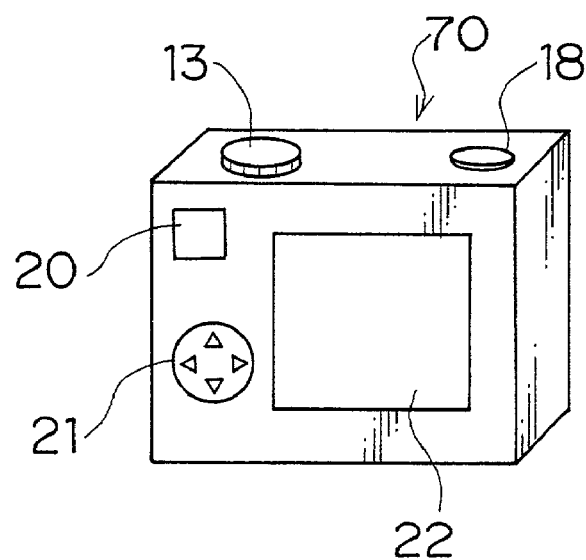
FIG. 17 is a rear perspective view of the camera in another embodiment of the present invention.
Figure 18:
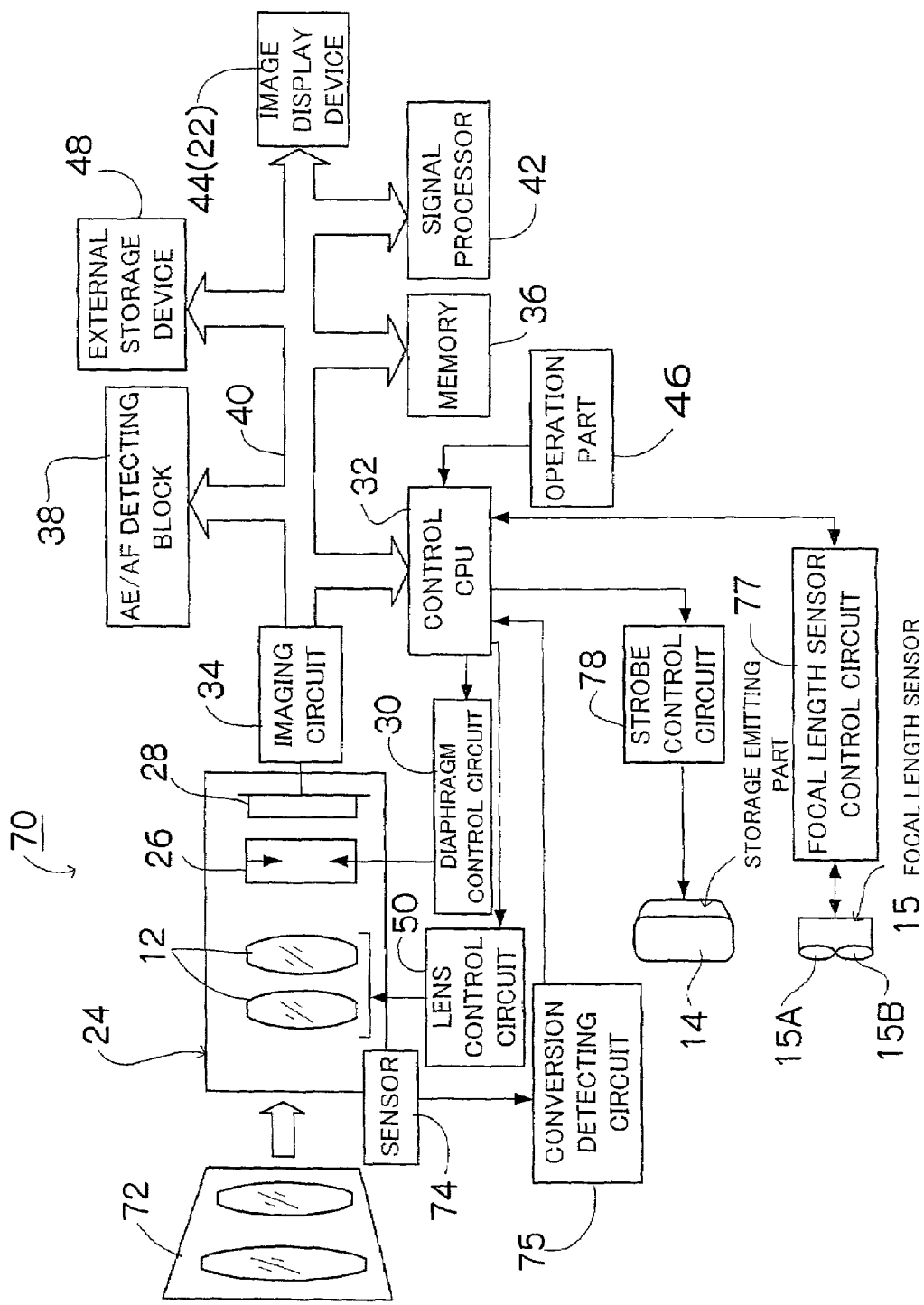
FIG. 18 is a block diagram of the camera in FIG. 16.
Figure 19:
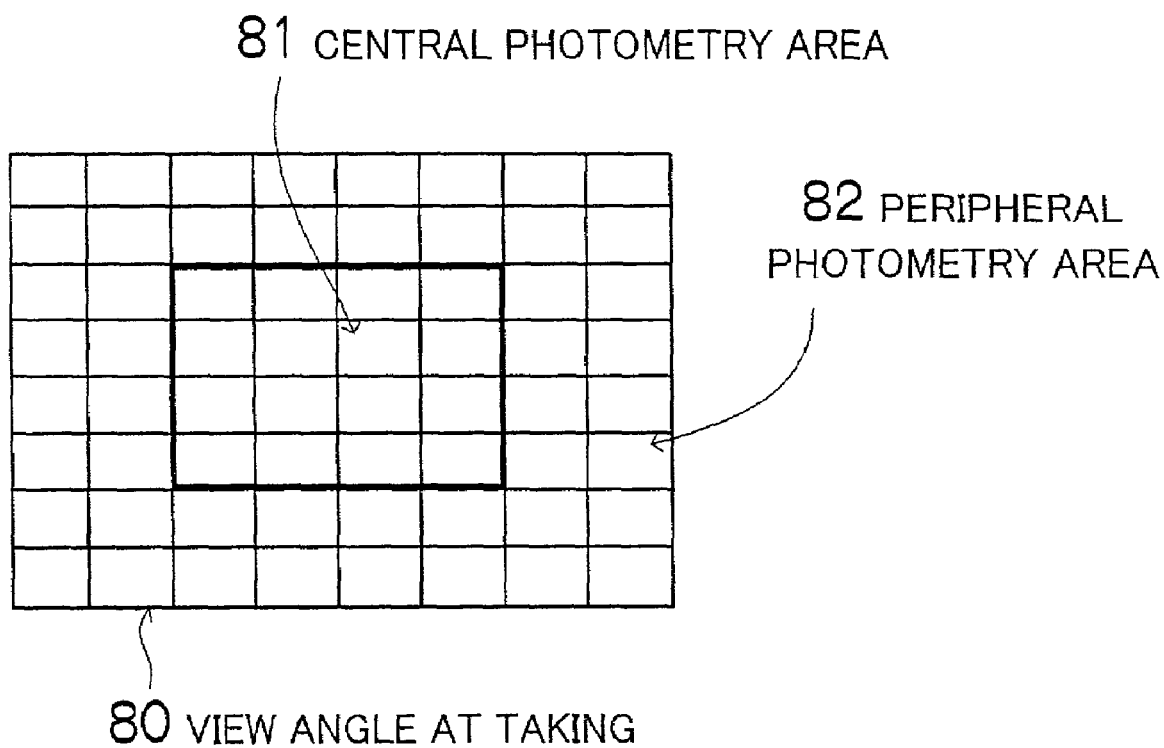
FIG. 19 is a schematic view of dividing photometry.

FIGS. 16 and 17 are views showing an outer appearance of a camera 70 and FIG. 18 is a block diagram of the camera 70 in the alternative embodiments of the present invention. The parts which are similar or the same as those of the camera 10 are assigned the same reference numbers, and the description on them is omitted.

A wide conversion lens 72 can be attached to the top end of the barrel of the camera 70 in FIG. 16. Moreover, the camera 70 has the mode dial 13, and the photometry sensor 15 comprising an AF illuminating part 15A and an AF light receiving part 15B is disposed at the front face of the camera. An active sensor is used in the present embodiment, but the photometry sensor is not limited to that; sensors such as a phase contrast sensor of a passive format may be used.

The mode dial 13 is a means for selecting operation modes of the camera. Modes such as a set up mode, a successive taking mode, a manual taking mode, an automatic taking mode, a scene selecting mode, and a movie (moving image) taking mode, a reproducing mode, can be set by operating the mode dial 13. Marks indicating each of the modes are printed on the top of the mode dial 32 (the marks are a pictorial character or a symbol illustrating the modes). A mode is set by matching a mark of a desired mode with a predetermined position.

When the set up mode is selected, a set up screen is displayed on the liquid crystal monitor 22. In the set up screen, a desired combination can be selected among plural image sizes (pixels) and plural compression rates (qualities) which are prepared beforehand. Specifically, regarding the image size (a number of pixels), there are 2832×2128 pixels, 2048×1536 pixels, 1280×960 pixels, 1280×960 pixels, or 640×480 pixels are selectable image sizes. Regarding the compression rate, "FINE" which is ¼ (JPEG) compression, "NORMAL" which is ⅛ (JPEG) compression, "BASIC" which is 1/16 (JPEG) compression are selectable qualities. A user designates a combination of the image size and the compression rate which are suitable for a purpose of the taking. In a movie (moving image) mode, the image size, the frame rate, and the recording method are predetermined; for example, moving image data should be recorded by 320× 240 pixels, 10 frames per seconds, and Motion JPEG format when taking a moving image.

In a scene selecting mode, a portrait mode, a scene mode, a night view mode, and a monochrome mode can be set by operating a menu. A setting suitable for a scene to be taken is automatically done by using those modes corresponding with taking conditions.

As seen from FIG. 17, a cross key 21 is provided to the rear face of the camera 70. The cross key 21 is a multi-function button which can input instructions of the four directions: up and down, and right and left. The cross key 21 is used as an operation button for instructing selecting of the respective setting items and a change of setting contents in the menu screen, and at the same time is used as an instruction means for magnification adjustment operation (zoom operation) and for forwarding and rewinding the reproduced frame.

As seen from FIG. 18, the sensor 74 for detecting attachment of the wide conversion lens 72 is provided at the top end of the optical unit with which the wide conversion lens 72 is detachable, and the detected signal of the sensor 74 is transmitted to the control CPU 32 via a conversion detecting circuit 75. The CPU 32 can recognize the attachment of the wide conversion lens 72 by the detected signal notified from the conversion detecting circuit 75.

A photometry sensor control circuit 77 controls operations of the photometry sensor 15 in accordance with an instruction from the CPU 32. The detected signal obtained from the photometry sensor 15 is transmitted to the CPU 32 via the photometry sensor control circuit 77. The CPU 32 can recognize the focal length by the detected signal from the photometry sensor 15.

A strobe control circuit 78 controls the flash of the strobe emitting part 14 in accordance with the CPU 32. In other words, the strobe control circuit 78 controls charging of a main condenser (not shown) as well as a timing for emitting light to the strobe emitting part 14, and also controls stopping the light emission based on the detected result of a strobe light adjusting sensor. The subject under low brightness can be taken at a proper exposure level by emitting light from the strobe emitting part 14.

As described before, the iris diaphragm 26 can be changed in the range F1.4-F11, but the range F2.8-F8 secures the predetermined optical capability. In general, the image quality at the periphery of the screen is lowered and the image is blurred when the diaphragm is opened too large. Since the image should not be taken by the diaphragm, the image is usually taken in accordance with a program line which uses F2.8-F8, which satisfied the optical capability.

Despite the fact that the image quality at the periphery of the screen is lowered when the diaphragm is opened, the image quality at the center of the screen is hardly affected. In a case where the strobe emits light under low brightness, a reaching length of the strobe light can be extended by changing the control of the diaphragm at the aperture side because the main subject is often present at the center of the screen even though the image quality of the periphery is lowered.

The reaching length L of the strobe light is determined by an amount of light G No emitted from the strobe and a focus value F of the camera, and is defined by the following formula (1)

$$GNo = F \times L \qquad (1)$$

Since G No is constant in cameras, the smaller the F is (that is, the diaphragm is opened), the longer the reaching length L will be. Therefore, the reaching length can be extended by using the aperture side rather than the side which is used for the normal taking (strobe unused).

Yet, the image is easily deteriorated if the aperture side is always used; thus the taking is executed by the focus within the range which secures the capability as far as the focus (F value) can secure the capability by the outputs of the photometry sensor 15 which are calculated from the formula (1). If the focal length to the subject is longer, the focus is used with which the image quality at the periphery of the image is not in the range that secures the capability, in order to avoid deterioration of the capability.

As shown in FIG. 9, the strobe emits light (pre-emission), and dividing photometry is performed by using the photometry means of the AE/AF detect block 38. In FIG. 18, a view angle 30 is divided into small 64 (8×8) blocks like a matrix, and the 16 (4×4) blocks at the center of the screen are set as a central photometry area 81, and other blocks are set as a peripheral photometry area 82.

If a photometry value at the central photometry area 81 is high and a photometry value of the peripheral photometry area 82 is low (that is, the periphery is dark) as a result of the dividing photometry, it is recognized that the subject is not present at the periphery of the screen. In that case, the extra aperture size may be used in combination of the result of the photometry by giving a condition that the subject distance is long and the subject is not present at the periphery of the screen after the pre-emission.

Assuming that the wide conversion lens is attached to the camera, the image quality at the periphery tends to be poor, but as described before, such deterioration of the image quality at the periphery may be accepted. Since the lighting characteristics of the strobe device built in the camera is inherently designed to correspond with the view angle when the wide conversion lens is not used (when a standard taking lens is used), the strobe is not emitted to the periphery in the view angle at taking with the wide conversion lens being attached (which means the strobe does not reach to the periphery of the view angle at taking). Therefore, the camera 70 of the present invention can extend a reaching distance of the strobe by using the extra aperture size in a case where a taking is performed in accompaniment with the strobe emission. Moreover, whether or not the extra aperture size is used may be determined in combination with the photometry result by the photometry sensor 15.

Alternative Embodiment 2

Figure 20:
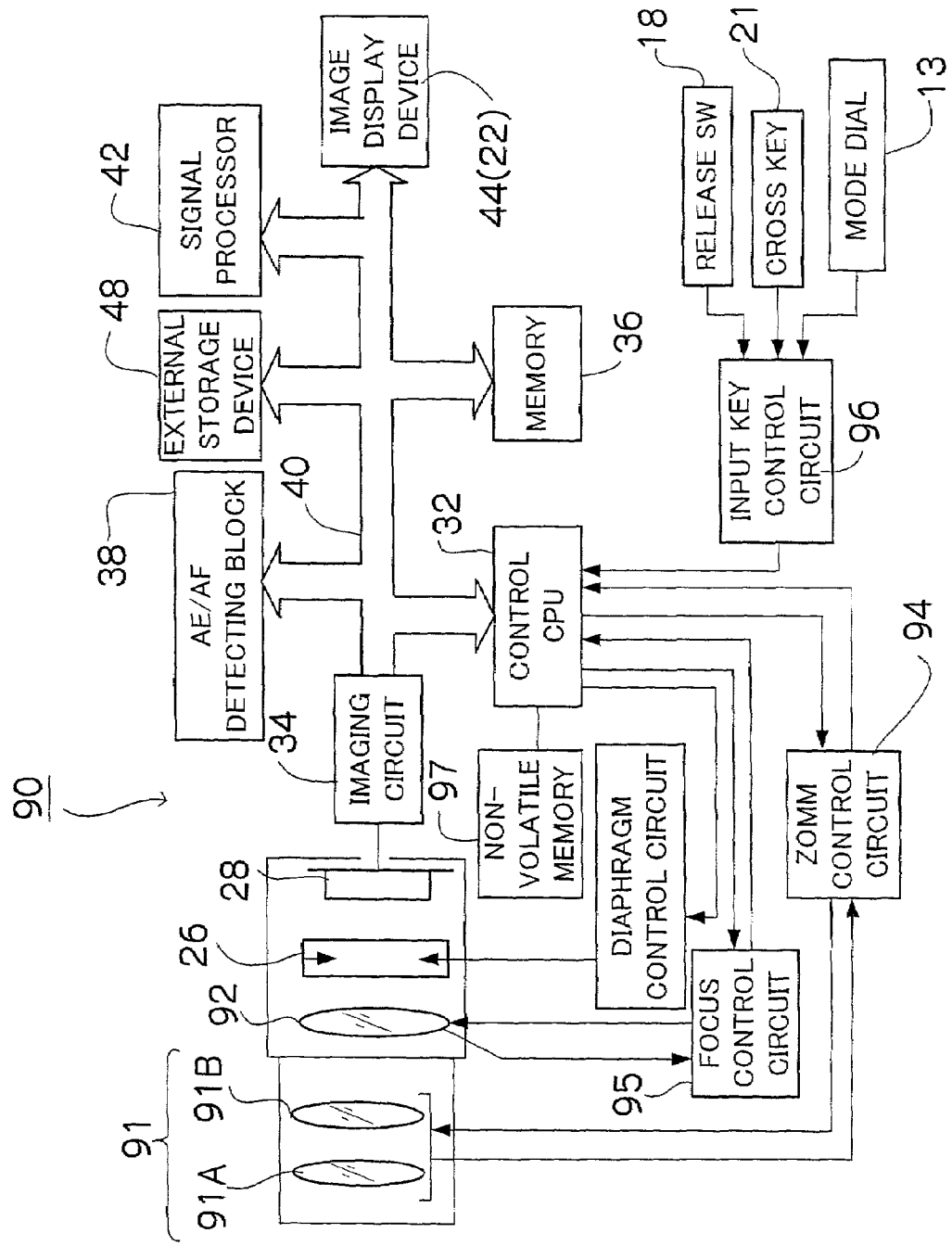
FIG. 20 is a block diagram of the camera in still another embodiment of the present invention.

Next, another alternative embodiment of the present invention will be described. FIG. 20 is a block diagram of a camera 90 of the present embodiment. The same or similar parts as those in FIG. 3 are assigned the same reference numbers and the description on them is omitted.

A taking system (the taking lens 12) of the camera 90 in FIG. 20 has a zoom lens 91 and a focus lens 92. A lens group 91A and a lens group 91B move along an optical axis while a positional relationship between the two lens groups 91A and 91B is regulated by the cam mechanism (not shown) in order to change a focal length. A zoom control circuit 94 controls driving of the zoom lens 91 in accordance with an instruction from the control CPU 32. The focus lens 92 contributes to focus adjustment. A focus control circuit 95 controls driving of the focus lens 92 in accordance with an instruction from the CPU 32.

A signal from the operation part such as the release switch 18 and the cross key 21 is inputted into the CPU 32 via an input key control circuit 96. The CPU 32 processes and controls properly based on an operation signal received from the input key control circuit 96, plus the CPU 32 also obtains the focal length data and focus position data via the zoom control circuit 94 and the focus control circuit 95 and controls the diaphragm control circuit 30, the zoom control circuit 94, and the focus control circuit 95 based on the obtained data. A non-volatile memory 97 composed of an EEPROM and a flash ROM stores data related to the MTF of the taking lens 12 installed in the camera 90. The CPU 32 refers the data within the non-volatile memory 97 as required, and performs corrections in accordance with an aperture size of the diaphragm, a focus position, and a zoom position.

In general, macro capability of the camera is regulated by the image quality of the lens in many cases, and a short distance limit (MOD) is set by referring to the MTF at the center or the periphery of the screen. When taking under a low resolution mode, however, the taken image is not affected despite some deterioration of the MTF at the center of the screen because a resolution mode at the time of the taking is the low resolution mode. The taken image is not affected either if the image quality of the central portion (area to be recorded) is secured despite the poor resolution capability at the periphery in a case of taking by using an electronic zoom (a function for enlarging an image by a signal process rather than by an image processing technology for electronically processing the taken image data so as to enlarge the image).

Therefore, a taking in a subject distance which is shorter than the short distance limit (MOD) in the normal taking can be performed at a time of taking under the low resolution mode or taking by using the electronic zoom.

Figure 22:
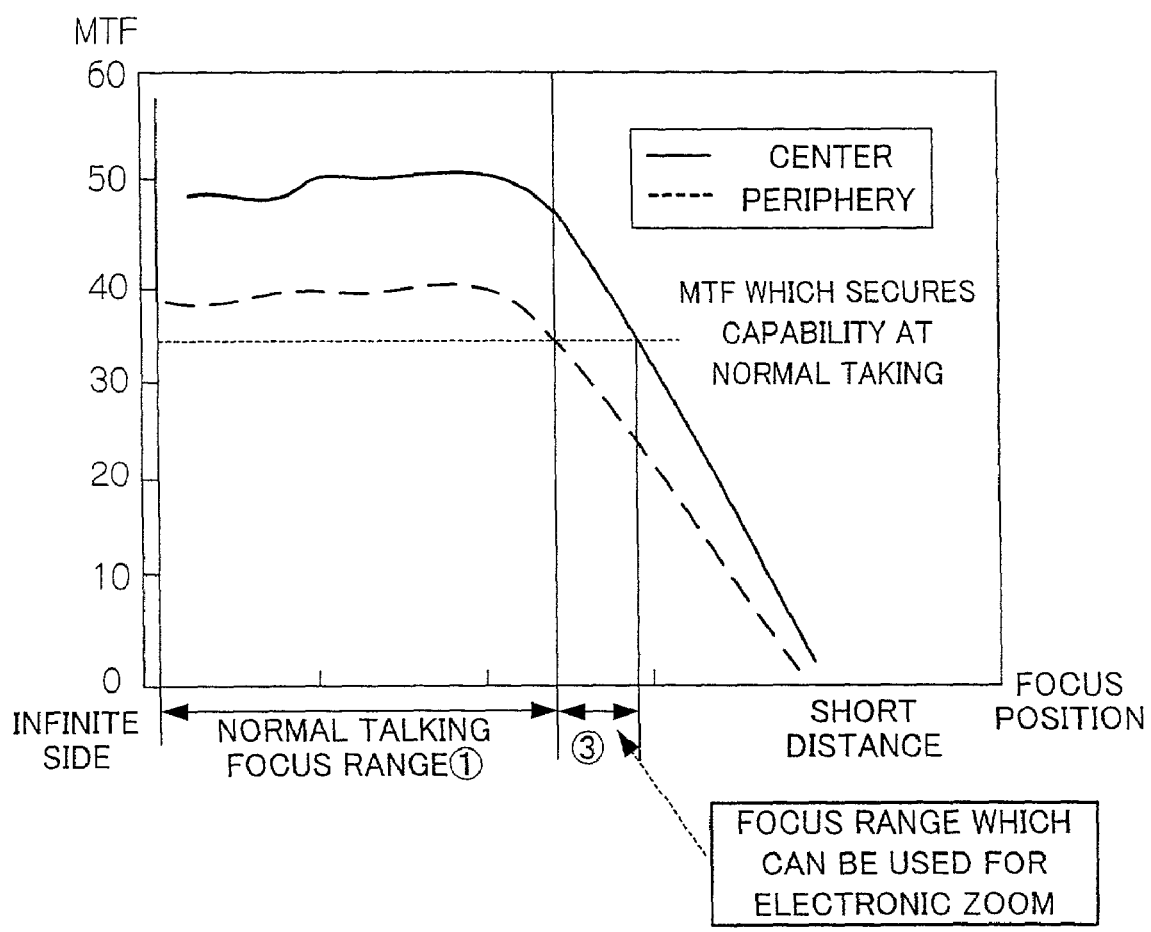
FIG. 22 is a graph showing a relationship (in the electronic zoom) between the focus position and the MTF.

FIGS. 21 and 22 shows a relationship between the subject distance and the lens capability. FIG. 21 is a graph indicating a relationship between the focus position and the MTF (in a case of a taking under a low resolution). A solid line indicates the MTF which is at the center of the view angle when taking, and the dotted line indicates the MTF at the periphery.

As seen from FIG. 21, a restriction (short distance limit) at the short distance side in the normal taking is designated since 35% or more area of the MTF both at the center and the periphery in the normal taking is determined as a level to secure the image quality. Thus the focus adjusting range in the normal taking is regulated as shown in (1).

In the low resolution, however, the taken image is not affected despite the MTF being lowered down to 20%, so a taking in still a shorter distance can be possible in the low resolution mode. Therefore, the camera 90 of the present embodiment changes the focus adjusting range (regulation at the short distance side) corresponding with the resolution when taking which is determined by a combination of the image size (pixel) and the compression rate (quality), and expands the focus adjusting range closer to the short distance side as shown in (2).

FIG. 22 shows the relationship between the focus position and the MTF. As seen from FIG. 22, the area in which the MTF at the center and the periphery of the screen in the normal taking is 35% is a level that can secure the image quality. However, because it is satisfactory to secure 35% or more at the center only in the electronic zoom, a taking in still a shorter distance is possible in a range which satisfies the 35% level. Thus, the camera 90 of the present embodiment changes the focus adjusting range corresponding with a magnification of the electronic zoom, and controls to make the taking possible at a side still closer to the short distance side as shown in (3).

Alternative Embodiment 3

Figure 23:
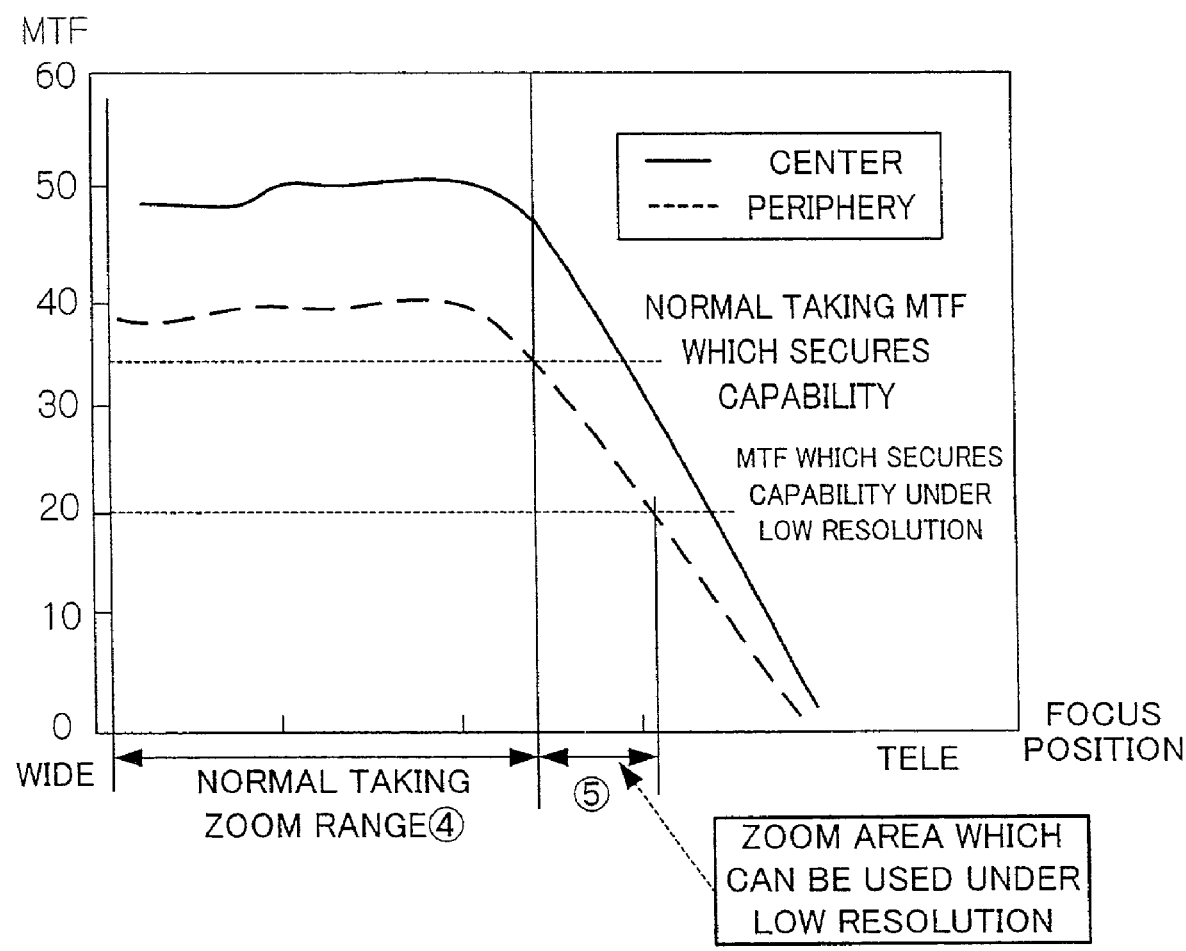
FIG. 23 is a graph showing a relationship (in the taking under a low resolution) between a focal length and the MTF.
Figure 24:
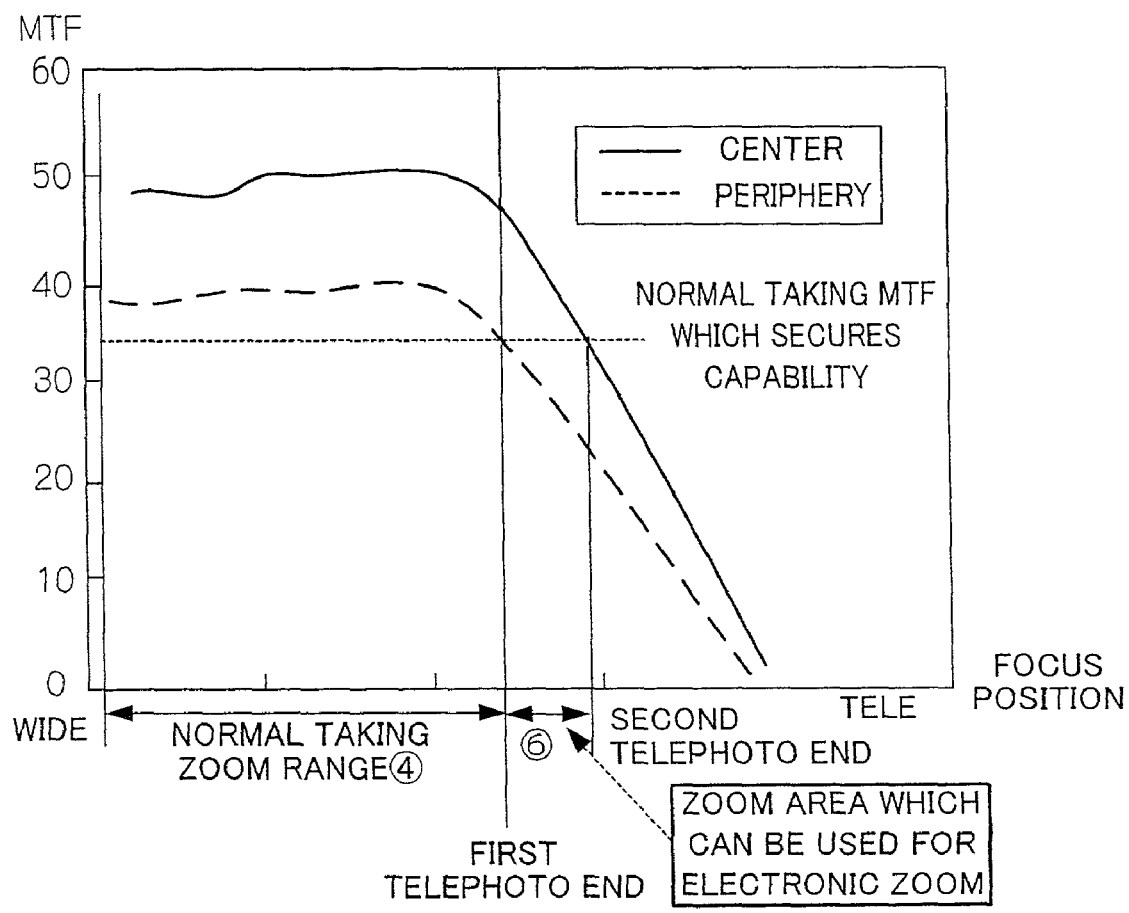
FIG. 24 is a graph showing the relationship (in the electronic zoom) between the focal length and the MTF.

FIGS. 21 and 22 show an embodiment for use at outside the range which secures the capability with respect to the focus position (focus), but there is also am embodiment for use at outside the range which secures the capability with respect to the focal length (zoom). FIGS. 23 and 24 show the relationship between the focal length and the lens capability.

FIG. 23 shows a graph of a relationship between the focal length and the MTF (when taking under low resolution). As seen from FIG. 23, an area where the MTF at the center and the periphery is 35% or more in the normal taking is the level which secures the capability, by which the regulation at a telephoto side is decided; in short, a focal length changeable range (zoom range) in the normal taking is regulated as shown in (4).

In the low resolution, however, the taken image is not affected despite the MTF being lowered down to 20%, so the taking at a side which is still closer to the telephoto side is possible in the low resolution mode. The camera 90 in the present embodiment changes the zoom range (regulation at the telephoto side) corresponding with the resolution at taking which is determined by a combination of the image size (pixel) and the compression rate (quality), and expands the focus adjusting range closer to the short distance side as shown in (5).

FIG. 24 shows the relationship between the focus position and the MTF. As seen from FIG. 22, the area in which the MTF at the center and the periphery of the screen in the normal taking is 35% is a level that can secure the image quality. However, because it is satisfactory to secure 35% or more at the center only in the electronic zoom (digital zoom), a taking of a side which is closer to the telephoto side is possible in a range which satisfies the 35% level. Thus, the camera 90 of the present embodiment changes the focus adjusting range corresponding with a magnification of the electronic zoom, and controls to make the taking possible of a side which is still closer to the telephoto side as shown in (6).

Figure 25:
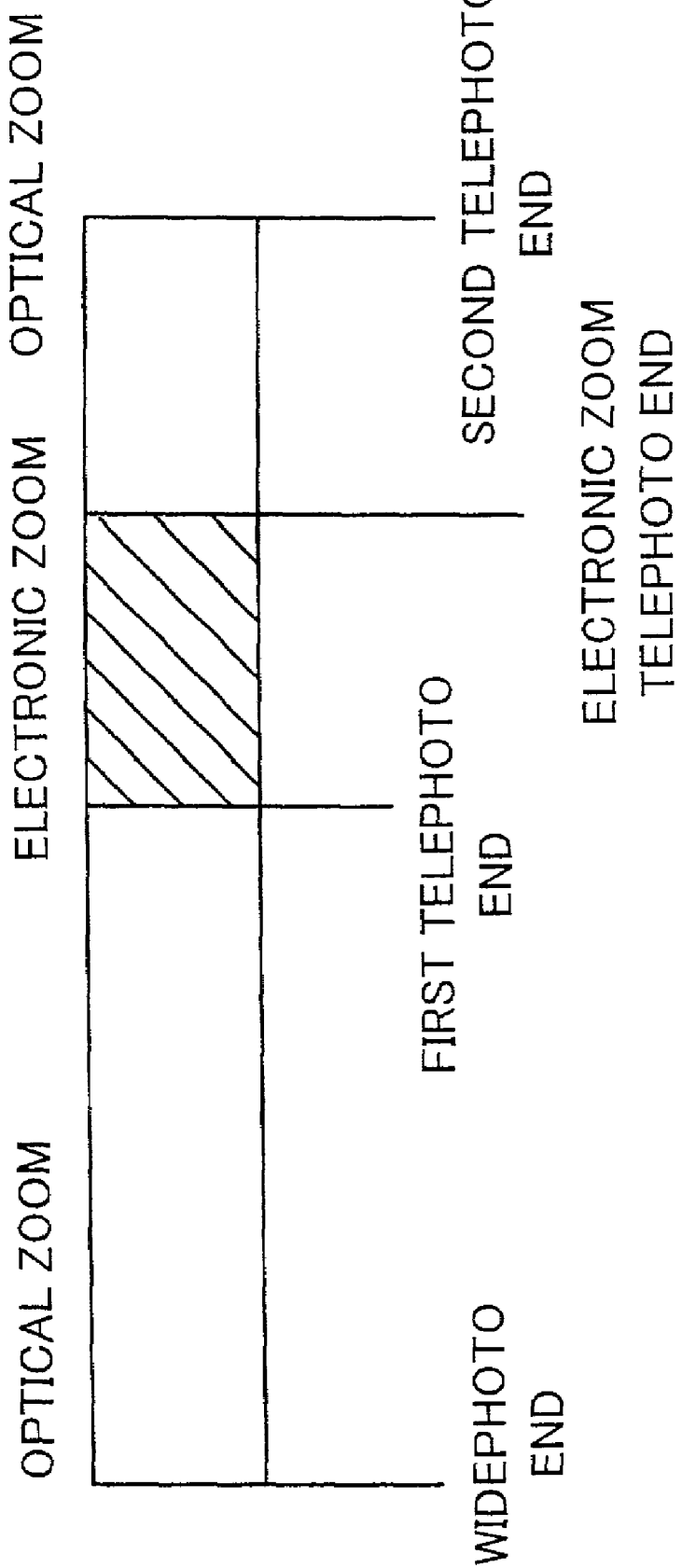
FIG. 25 is a schematic view showing a zoom range by a combination of an optical zoom and an electronic zoom.

FIG. 25 is a schematic view of the zoom range by a zoom control, which is a combination of the optical zoom and the electronic zoom. As seen from FIG. 25, only the center portion of the view angle at taking is enlarged by the electronic zoom after driving the zoom from a widephoto end of the optical zoom to the end position (first telephoto side) at a long focal length side which can be taken in the normal taking. The zoom range of the optical zoom (limit position of the telephoto side) is extended by following the enlarging process of the electronic zoom, thus the zoom can be driven by the optical zoom to a second telephoto end at a long focal length side after extending the zoom range of the electronic zoom up to the limit (the telephoto end of the electronic zoom).

Alternative Embodiment 4

Vibrations occur more easily when the focal length of the taking optical system is closer to the telephoto side, but blur caused by such vibrations may not be very obvious in a taking under low resolution. Thus, an amount of blur (amount of vibrations) of the image is calculated and the amount of blur and the image quality data are compared. If the amount of the blur by the vibration is more than the effects of deterioration of the image quality, the extra aperture size is used so as to accelerate the shutter speed, and an image is taken preferably at a point at which the vibrations and the image quality are balanced. In addition, a known detecting means such as an angle speed sensor may be applied to the method for detecting the vibrations.

Alternative Embodiment 5

In order to achieve a taking at outside the range which secures the capability of the taking optical system, the resolution of the taken image can be improved by changing an edge (contour) intensity process (so-called an "aperture process") with respect to the image signal. In other words, resolution is improved by intensifying the contour in the aperture process so that the lowered image quality when using at outside the range which secures the capability is supplemented. The resolution of the outputted image can be equal within the range which secures the capability despite a change in MTF by changing the aperture process corresponding with the aperture size of the diaphragm.

Figure 26:
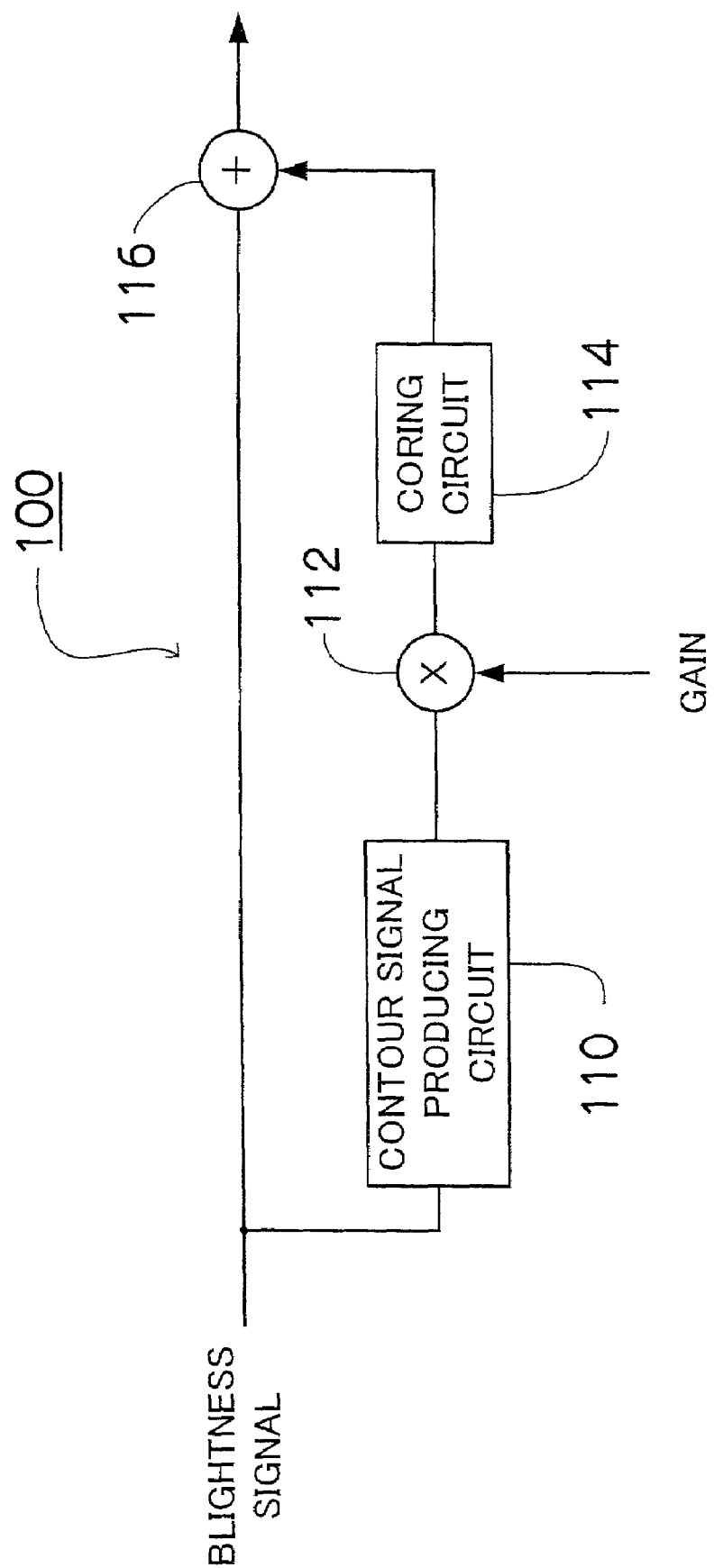
FIG. 26 is a block diagram showing an example of the contour intensity circuit.

The aperture process (contour correction process) is performed in the signal processing part 42 in FIG. 20. FIG. 26 is a block diagram showing an example of a structure of the contour correcting circuit. A contour correction circuit 100 in FIG. 20 comprises a contour signal producing circuit 110, a multiplier 112 which multiplies a contour signal by a gain, a coring circuit 114 which reduces values of a small amplitude component of an output of the multiplier 112 to zero, and an adder 116 for adding a contour correction signal outputted from the coring circuit 114 to original brightness signal.

A gain value α of the multiplier 112 and a coring level in the coring circuit 114 are controlled by the CPU 32 in FIG. 20. The CPU 32 changes the gain value α and the coring level so as to supplement the lowered image quality when used at outside the range which secures the capability by referring to the data within the non-volatile memory 97. Thereby, correction of every diaphragm and correction by the focus position or the zoom position can be achieved.

Alternative Embodiment 6

Figure 27:
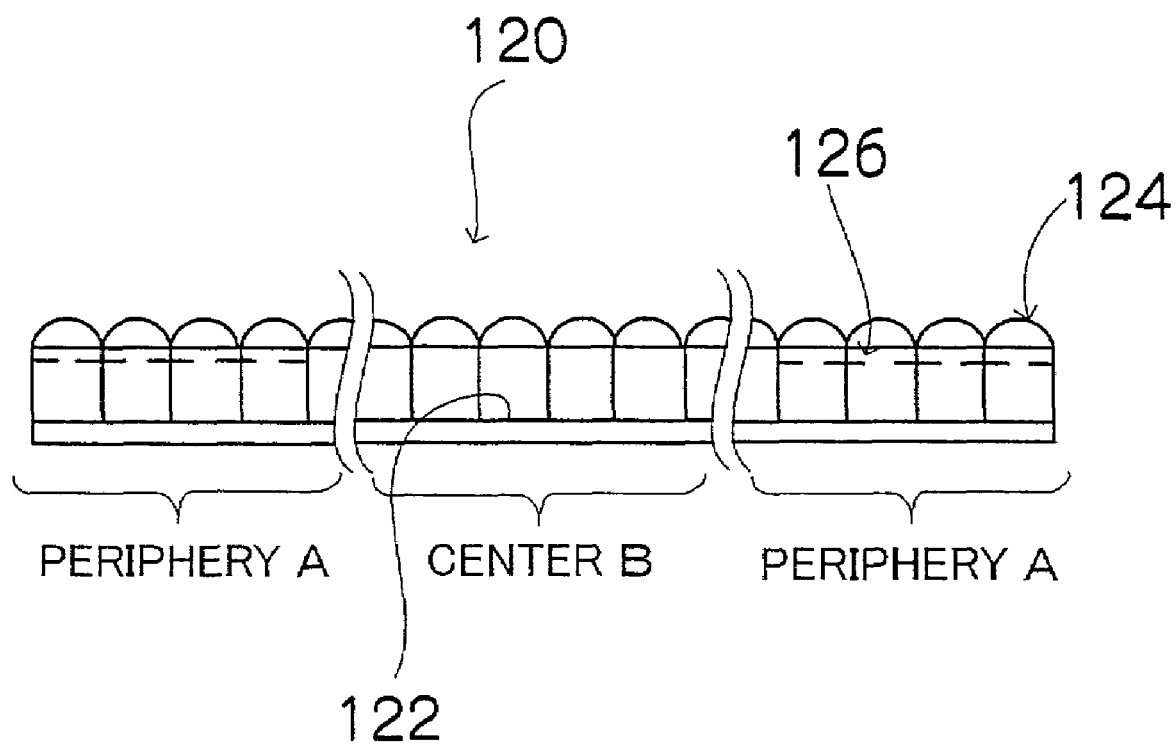
FIG. 27 is a section view of a solid-state imaging device in the embodiment of the present invention.

FIG. 27 is a section view of a solid-state imaging device (CCD) 120 of the present embodiment. As seen from FIG. 27, the CCD 120 has a structure in which many photodiodes 122 are arranged in serial on a plane. A micro lens 124, which forms the subject image on the light receiving surface of each of the photodiodes, is provided so as to correspond with each of the photodiodes 120.

As seen from FIG. 27, a light shielding mask 126 is provided between the micro lens 124 and the photodiodes 122 in order to adjust the aperture with respect to the micro lens 124 positioned at a periphery A in the CCD light receiving surface. On the other hand, the light shielding mask is not provided to a section of a central portion B in the CCD light receiving surface.

Since the CCD 120 in the structure described above adjusts the amount of light entering into the photodiodes 122 of the periphery A, deterioration of the image quality at the periphery can be prevented compared with a conventional CCD without the light shielding mask 126. In other words, the CCD 120 adjusts the aperture of the micro lens with the light shielding mask 126 in the area in which the conventional CCD cannot be used due to the deteriorated image quality at the periphery, thus the CCD 120 can be used at outside the area which secures the capability.

If the CCD 120 in the structure described above and shown in FIG. 27 is used, the amount of light at the periphery decreases, and shading (difference in brightness in an image) increased; but this problem can be resolved by performing a known shading correction process in the signal processing part 42 in FIG. 20.

In FIG. 27, the periphery A is provided with the light shielding mask 126 while the periphery B is not; but sections are not restricted to divide the sections in two, but plural types of aperture rate of the light shielding mask may be set, and the aperture rate decreases from the center to the periphery of the screen.

Alternative Embodiment 7

Sometimes an image which suites a mode better if blurred at the periphery, depending on some taking modes selected by the camera 90. For example, a portrait mode is one which fits this situation, in which the subject at the center of the screen appears clearly with respect to the blurred periphery. In that case, the aperture size of the diaphragm is set at the aperture side in order to narrow the depth of field; but the blur at the periphery increases regarding the focus at outside the range which secures the capability if there is a focus area in which only the image quality at the periphery is deteriorated. Thus the focus area (the area at outside the range which secures the capability) can be used.

FIG. 24 shows the relationship between the focus position and the MTF. When the portrait mode is selected by the mode dial 13 in FIG. 16, the camera is automatically controlled so that the image which is blurred at the periphery is taken by using the program line that uses the extra aperture size. Taking modes which can be selected by the mode dial 13 are a sport mode which is suitable for taking a moving subject (a mode which takes priority to the shutter for taking an image at a shutter speed at a high speed side), a night view mode, a scenery mode, and so forth. The night view can be taken bright by using the extra aperture size, and the extra aperture can also be used at a time of a slow synchronism using a strobe (a strobe taking by a slow shutter which takes the night view and the subject with a good quality).

As described above, the present invention provides unspecified aperture sizes (extra aperture size and extra small size) which are not used for a normal taking, and uses the unspecified aperture sizes corresponding with an operating situations such as automatic exposure, auto focus, electronic zoom, movie display, and taking after thinning out (under a low resolution mode). Therefore, the capability of the lens can be fully applied without deteriorating the taken image, and the respective capability of the camera can be improved.

Moreover, the present invention provides a technique for improving and expanding the capability of the camera by proving a wider interlocking range than a normal taking range, with regard not only to the diaphragm but also to a zoom range (operatable range of a focal length) and a focus adjustment range, and using the lens at outside the range which secures its capability corresponding with a taking condition and a special use.

It should be understood, however, that there is no intention to limit the invention to the specific forms disclosed, but on the contrary, the invention is to cover all modifications, alternate constructions and equivalents falling within the spirit and scope of the invention as expressed in the appended claims.

The invention claimed is:

1. An apparatus for controlling an aperture of a camera, comprising:
   a first determining device that determines an aperture range for a normal shooting which secures predetermined optical capability which is required for capturing images, except during automatic exposure, automatic focus, electronic zoom, real-time displaying of a moving image, recording of the moving image, and recording of an image with low resolution due to reduced pixels;
   a second determining device that determines an aperture range including an aperture out of the aperture range for the normal shooting; and
   a controlling device that controls a diaphragm mechanism; the controlling device capable of setting the aperture out of the aperture range for the normal shooting as determined by said second determining device when obtaining at least one of photometry data of automatic exposure and video signals of auto focus, and
   the controlling device capable of setting the aperture within the aperture range determined by said first determining device when recording an image.

2. The apparatus for controlling the aperture of the camera as defined in claim 1, wherein an operation of obtaining the at least one of the photometry data of the automatic exposure and the video signals of the auto focus is performed prior to shooting for recording of the image.

3. The apparatus for controlling the aperture of the camera as defined in claim 2, wherein the operation of obtaining the at least one of the photometry data of the automatic exposure and the video signals of the auto focus is performed by half-depressing a release button, and the shooting for the recording of the image is performed by fully depressing the release button.

4. The apparatus for controlling an aperture of a camera as defined in claim 1, wherein the aperture out of the aperture range for the normal shooting is more that F1.4 and less than F2.8.

5. A camera, comprising:
   a taking lens;
   a diaphragm mechanism that adjusts an amount of light which enters the camera through said taking lens;
   a first determining device that determines an aperture range for a normal shooting which secures predetermined optical capability which is required for capturing images, except during automatic exposure, automatic focus, electronic zoom, real-time displaying of a moving image, recording of the moving image, and recording of an image with low resolution due to reduced pixels;
   a second determining device that determines an aperture range including an aperture out of the aperture range for the normal shooting; and
   a controlling device for controlling the aperture of the diaphragm mechanism,
   the controlling device capable of setting the aperture out of the aperture range for normal shooting as determined by said second determining device when obtaining at least one of photometry data of automatic exposure and video signals of auto focus, and
   the controlling device capable of setting the aperture within the aperture range as determined by said first determining device when recording an image.

6. The camera as defined in claim 5, wherein an operation of obtaining the at least one of the photometry data of the automatic exposure and the video signals of the auto focus is performed prior to shooting for recording of the image.

7. The apparatus for controlling the aperture of the camera as defined in claim 6, wherein the operation of obtaining the at least one of the photometry data of the automatic exposure and the video signals of the auto focus is performed by half-depressing a release button, and the shooting for the recording of the image is performed by fully depressing the release button.

8. The camera as defined in claim 5, wherein the aperture out of the aperture range for the normal shooting is more that F1.4 and less than F2.8.

9. A method for controlling an aperture of a camera, comprising the steps of:
   determining the aperture out of an aperture range for a normal shooting which secures predetermined optical capability when shooting in a low-resolution mode; and
   controlling a diaphragm mechanism to use said aperture according to whether a shooting mode selected is the normal shooting mode or the low-resolution mode,
   wherein said aperture is set within the normal shooting range in the normal shooting mode, and
   wherein in order to increase brightness when shooting in the low-resolution mode, the aperture out of aperture range includes an aperture opening that is larger than that of the aperture opening in the normal shooting mode.

10. The method for controlling the aperture of the camera as defined in claim 9, wherein the aperture is used when a portrait mode is selected as the shooting mode.

11. The method for controlling the aperture of the camera as defined in claim 9, wherein the aperture out of the aperture range for the normal shooting is more that F1.4 and less than F2.8.

12. An apparatus for controlling an aperture of a camera, comprising:

a first determining device that determines an aperture range for a normal shooting which secures predetermined optical capability;

a second determining device that determines an aperture range including an aperture out of the aperture range for the normal shooting; and a controlling device for controlling a diaphragm mechanism, the controlling device capable of setting the aperture within the aperture range as determined by the first determining device when shooting in a high-resolution mode, and the controlling device capable of setting the aperture out of the aperture range for the normal shooting as determined by said second determining device when shooting in a low-resolution mode, wherein in order to increase brightness when shooting in the low-resolution mode, the aperture out of aperture range includes an aperture opening that is larger than the aperture opening of the aperture when shooting in the high-resolution mode.

13. The apparatus for controlling the aperture of the camera as defined in claim 12, wherein the controlling device uses said second determining device when shooting in a portrait mode.

14. The apparatus for controlling the aperture of the camera as defined in claim 12, wherein the aperture out of the aperture range for the normal shooting is more that F1.4 and less than F2.8.

15. A camera, comprising:
a taking lens;
a diaphragm mechanism that adjusts an amount of light entering the camera through a taking lens;
a first determining device that determines an aperture range for a normal shooting which secures predetermined optical capability;
a second determining device that determines an aperture range including an aperture out of the aperture range for the normal shooting;
a shooting mode setting device that sets a shooting mode; and
a controlling device for controlling the diaphragm mechanism the controlling device capable of setting the aperture within the aperture range as determined by the first determining device when shooting in a high-resolution mode, and
the controlling device capable of setting the aperture out of the aperture range for the normal shooting when shooting in a low-resolution mode,
wherein in order to increase brightness when shooting in the low-resolution mode, the aperture out of aperture range includes an aperture opening that is larger than the aperture opening of the aperture when shooting in the high-resolution mode.

16. The camera as defined in claim 15, wherein the controlling device uses said second determining device when a portrait mode is selected by said shooting mode setting device.

17. The camera as defined in claim 15, wherein the aperture out of the aperture range for the normal shooting is more that F1.4 and less than F2.8.

18. An apparatus for controlling an aperture of a camera, comprising:
a first determining device that determines a first aperture range used for securing a predetermined optical capability which is required for capturing images, except during automatic exposure, automatic focus, electronic zoom, real-time displaying of a moving image, recording of the moving image, and recording of an image with low resolution due to reduced pixels;
a second determining device that determines a second aperture range including an aperture out of an aperture range of the first aperture range, the aperture in the second aperture range being used for obtaining at least one of photometry data of automatic exposure and video signals of auto focus; and
a controlling device for controlling the diaphragm mechanism,
the controlling device capable of setting the aperture in the second aperture range as determined by said second determining device, and
the controlling device capable of setting the diaphragm mechanism the aperture within the first aperture range as determined by said first determining device for recording the image.

19. The apparatus for controlling an aperture of a camera as defined in claim 18, wherein the aperture out of the aperture range of the first aperture range is more that F1.4 and less than F2.8.

20. A camera, comprising:
a taking lens;
a diaphragm mechanism that adjusts an amount of light which enters the camera through said taking lens;
a first determining device that determines a first aperture range used for securing a predetermined optical capability which is required for capturing images, except during automatic exposure, automatic focus, electronic zoom, real-time displaying of a moving image, recording of the moving image, and recording of an image with low resolution due to reduced pixels;
a second determining device that determines a second aperture range including an aperture out of an aperture range of the first aperture range, the aperture in the second aperture range being used for obtaining at least one of photometry data of automatic exposure and video signals of auto focus; and
a controlling device for controlling the diaphragm mechanism,
the controlling device capable of setting the aperture in the second aperture range as determined by said second determining device, and
the controlling device capable of setting the diaphragm mechanism the aperture within the first aperture range as determined by said first determining device for recording the image.

21. The camera as defined in claim 20, wherein the aperture out of the aperture range of the first aperture range is more that F1.4 and less than F2.8.

* * * * *